(12) United States Patent
Louis

(10) Patent No.: US 7,586,032 B2
(45) Date of Patent: Sep. 8, 2009

(54) SHAKE RESPONSIVE PORTABLE MEDIA PLAYER

(75) Inventor: Rosenberg B. Louis, Arroyo Grande, CA (US)

(73) Assignee: Outland Research, LLC, Pismo Beach, CA (US)

( * ) Notice: Subject to any disclaimer, the term of this patent is extended or adjusted under 35 U.S.C. 154(b) by 288 days.

(21) Appl. No.: 11/539,598

(22) Filed: Oct. 6, 2006

(65) Prior Publication Data

US 2007/0125852 A1 Jun. 7, 2007

Related U.S. Application Data

(63) Continuation-in-part of application No. 11/461,375, filed on Jul. 31, 2006, now abandoned, and a continuation-in-part of application No. 11/267,079, filed on Nov. 3, 2005, now Pat. No. 7,542,816, and a continuation-in-part of application No. 11/246,050, filed on Oct. 7, 2005, now Pat. No. 7,519,537, and a continuation-in-part of application No. 11/466,381, filed on Aug. 22, 2006, now abandoned, and a continuation-in-part of application No. 11/285,534, filed on Nov. 22, 2005, now Pat. No. 7,489,979, and a continuation-in-part of application No. 11/427,320, filed on Jun. 28, 2006, now abandoned.

(60) Provisional application No. 60/739,313, filed on Nov. 23, 2005.

(51) Int. Cl.
*G10H 1/00* (2006.01)
*G10H 1/18* (2006.01)
*G10H 7/00* (2006.01)

(52) U.S. Cl. .......................................... 84/615; 700/94

(58) Field of Classification Search .................. 84/612, 84/615, 723; 700/94; 482/3–9, 900, 901
See application file for complete search history.

(56) References Cited

U.S. PATENT DOCUMENTS 4,018,121 A 4/1977 Chowning (Continued)

FOREIGN PATENT DOCUMENTS

DE 19650900 6/1998

(Continued)

OTHER PUBLICATIONS

Shahinpoor, Mohsen "Electro-mechanics of ionoelastic beams as electrically-controllable artificial muscles", *SPIE Conference on Electroactive Polymer Actuators and Devices, SPEE* vol. 3669, 1999.

(Continued)

*Primary Examiner*—Jeffrey Donels
(74) *Attorney, Agent, or Firm*—Thomas F. Lebens; Sinsheimer Juhnke Lebens & McIvor, LLP

(57) ABSTRACT

An apparatus, method and computer program product are provided which establishes a user interface for portable media players in which a user can mix, shuffle, randomize, or otherwise alter the selection and/or ordering of media items stored within and/or played by the portable media player by simply shaking the portable media player in a characteristic manner. It is a common human metaphor to mix the contents of a physical object, like a bottle of salad dressing or a carton of orange juice, by physically shaking the object. The various embodiments leverage this common and well known human activity by enabling a user to "mix" media items through a characteristic shaking motion as a type of user interface. This capability enables a user to have a portable media player automatically shuffle the order of songs stored within a play arrangement by shaking the portable media player using a characteristic shaking motion. The portable media player includes a motion sensor coupled to a processor, a control program to monitor signals output from the motion sensor and to interpret characteristic shaking motions for causing one or more changes to be made to a current play arrangement.

25 Claims, 6 Drawing Sheets

U.S. PATENT DOCUMENTS

| | | |
|---|---|---|
| 4,054,749 A | 10/1977 | Suzuki |
| 4,091,302 A | 5/1978 | Yamashita |
| 4,183,156 A | 1/1980 | Rudy |
| 4,219,945 A | 9/1980 | Rudy |
| 4,337,529 A * | 6/1982 | Morokawa .................... 377/20 |
| 4,360,345 A | 11/1982 | Hon |
| 4,430,595 A | 2/1984 | Nakasone |
| 4,446,634 A | 5/1984 | Johnson |
| 4,490,810 A | 12/1984 | Hon |
| 4,712,101 A | 12/1987 | Culver |
| 4,788,983 A * | 12/1988 | Brink et al. ................. 600/547 |
| 4,823,634 A | 4/1989 | Culver |
| 4,868,549 A | 9/1989 | Affinito |
| 4,907,973 A | 3/1990 | Hon |
| 4,919,418 A | 4/1990 | Miller |
| 4,934,694 A | 6/1990 | McIntosh |
| 4,936,029 A | 6/1990 | Rudy |
| 4,949,089 A | 8/1990 | Ruszkowski, Jr. |
| 4,983,901 A | 1/1991 | Lehmer |
| 4,999,932 A | 3/1991 | Grim |
| 5,042,176 A | 8/1991 | Rudy |
| 5,046,267 A | 9/1991 | Kilgore |
| 5,047,918 A | 9/1991 | Schwartz et al. |
| 5,047,952 A | 9/1991 | Kramer et al. |
| 5,149,084 A | 9/1992 | Dalebout et al. |
| 5,154,677 A | 10/1992 | Ito |
| 5,155,927 A | 10/1992 | Bates |
| 5,164,530 A | 11/1992 | Iwase |
| 5,185,561 A | 2/1993 | Good |
| 5,186,629 A | 2/1993 | Rohen |
| 5,189,355 A | 2/1993 | Larkins |
| 5,215,468 A * | 6/1993 | Lauffer et al. ............... 434/236 |
| 5,220,260 A | 6/1993 | Schuler |
| 5,267,942 A * | 12/1993 | Saperston .................... 600/28 |
| 5,271,858 A | 12/1993 | Clough et al. |
| 5,273,038 A | 12/1993 | Beavin |
| 5,296,846 A | 3/1994 | Ledley |
| 5,296,871 A | 3/1994 | Paley |
| 5,367,791 A | 11/1994 | Gross |
| 5,382,373 A | 1/1995 | Carlson |
| 5,451,192 A | 9/1995 | Hefele |
| 5,452,745 A | 9/1995 | Kordonsky |
| 5,491,546 A | 2/1996 | Wascher |
| 5,499,360 A | 3/1996 | Barbara et al. |
| 5,534,917 A | 7/1996 | MacDougall |
| 5,559,412 A | 9/1996 | Schuler |
| 5,572,201 A | 11/1996 | Graham et al. |
| 5,578,238 A | 11/1996 | Weiss |
| 5,592,143 A * | 1/1997 | Romney et al. ........ 340/309.16 |
| 5,599,474 A | 2/1997 | Weiss |
| 5,614,687 A | 3/1997 | Yamada et al. |
| 5,629,594 A | 5/1997 | Jacobus |
| 5,634,051 A | 5/1997 | Thomson |
| 5,643,087 A | 7/1997 | Marcus |
| 5,645,752 A | 7/1997 | Weiss |
| 5,666,138 A | 9/1997 | Culver |
| 5,690,582 A | 11/1997 | Ulrich et al. |
| 5,699,441 A | 12/1997 | Sagawa et al. |
| 5,701,140 A | 12/1997 | Rosenberg |
| 5,704,791 A | 1/1998 | Gillio |
| 5,709,219 A | 1/1998 | Chen |
| 5,721,566 A | 2/1998 | Rosenberg |
| 5,724,264 A | 3/1998 | Rosenberg |
| 5,728,960 A | 3/1998 | Sitrick |
| 5,731,804 A | 3/1998 | Rosenberg |
| 5,742,278 A | 4/1998 | Chen |
| 5,747,714 A | 5/1998 | Kniest et al. |
| 5,754,023 A | 5/1998 | Roston et al. |
| 5,755,577 A | 5/1998 | Gillio |
| 5,767,839 A | 6/1998 | Rosenberg |
| 5,769,640 A | 6/1998 | Jacobus |
| 5,791,908 A | 8/1998 | Gillio |
| 5,800,177 A | 9/1998 | Gillio |
| 5,800,178 A | 9/1998 | Gillio |
| 5,807,267 A | 9/1998 | Bryars et al. |
| 5,821,920 A | 10/1998 | Rosenberg |
| 5,825,308 A | 10/1998 | Rosenberg |
| 5,828,197 A | 10/1998 | Martin |
| 5,839,901 A | 11/1998 | Karkanen |
| 5,857,939 A | 1/1999 | Kaufman |
| 5,870,740 A | 2/1999 | Rose et al. |
| 5,872,438 A | 2/1999 | Roston |
| 5,882,206 A | 3/1999 | Gillio |
| 5,889,670 A | 3/1999 | Schuler |
| 5,889,672 A | 3/1999 | Schuler |
| 5,890,116 A | 3/1999 | Itoh et al. |
| 5,890,128 A | 3/1999 | Diaz et al. |
| 5,890,995 A | 4/1999 | Bobick et al. |
| 5,897,437 A | 4/1999 | Nishiumi |
| 5,906,767 A | 5/1999 | Karol |
| 5,907,293 A | 5/1999 | Tognazzini |
| 5,928,248 A | 7/1999 | Acker |
| 5,941,837 A | 8/1999 | Amano et al. |
| 5,952,065 A | 9/1999 | Mitchell |
| 5,952,596 A | 9/1999 | Kondo |
| 5,953,693 A | 9/1999 | Sakiyama et al. |
| 5,989,188 A | 11/1999 | Birkhoelzer et al. |
| 6,013,007 A * | 1/2000 | Root et al. ..................... 482/8 |
| 6,013,340 A | 1/2000 | Bonk |
| 6,024,576 A | 2/2000 | Moore |
| 6,088,017 A | 7/2000 | Tremblay |
| 6,096,004 A | 8/2000 | Meglan |
| 6,106,301 A | 8/2000 | Merril |
| 6,111,577 A | 8/2000 | Ziles |
| 6,119,114 A | 9/2000 | Smadja |
| 6,154,201 A | 11/2000 | Levin et al. |
| 6,160,489 A | 12/2000 | Perry |
| 6,177,905 B1 | 1/2001 | Welch |
| 6,192,340 B1 | 2/2001 | Abecassis |
| 6,199,014 B1 | 3/2001 | Walker et al. |
| 6,199,067 B1 | 3/2001 | Geller |
| 6,211,861 B1 | 4/2001 | Rosenberg et al. |
| 6,230,047 B1 * | 5/2001 | McHugh ..................... 600/519 |
| 6,244,742 B1 | 6/2001 | Yamada |
| 6,246,362 B1 * | 6/2001 | Tsubata et al. ......... 342/357.08 |
| 6,256,011 B1 | 7/2001 | Culver |
| 6,266,612 B1 | 7/2001 | Dussell |
| 6,281,786 B1 | 8/2001 | Adachi et al. |
| 6,285,317 B1 | 9/2001 | Ong |
| 6,287,262 B1 | 9/2001 | Amano et al. |
| 6,292,747 B1 | 9/2001 | Amro et al. |
| 6,298,323 B1 | 10/2001 | Kaemmerer |
| 6,300,938 B1 | 10/2001 | Culver |
| 6,304,520 B1 | 10/2001 | Watanabe |
| 6,314,094 B1 | 11/2001 | Boys et al. |
| 6,323,412 B1 | 11/2001 | Loo |
| 6,351,710 B1 | 2/2002 | Mays |
| 6,366,272 B1 | 4/2002 | Rosenberg |
| 6,376,971 B1 | 4/2002 | Pelrine |
| 6,378,558 B1 | 4/2002 | Pohl |
| 6,401,027 B1 | 6/2002 | Xu et al. |
| 6,401,037 B1 | 6/2002 | Muller et al. |
| 6,411,896 B1 | 6/2002 | Shuman et al. |
| 6,429,846 B2 | 8/2002 | Rosenberg |
| 6,457,262 B1 | 10/2002 | Swigart |
| 6,470,207 B1 | 10/2002 | Simon |
| 6,470,302 B1 | 10/2002 | Cunningham |
| 6,477,239 B1 | 11/2002 | Ohki et al. |
| 6,493,734 B1 | 12/2002 | Sachs et al. |
| 6,498,982 B2 | 12/2002 | Bellesfield et al. |
| 6,504,571 B1 | 1/2003 | Narayanaswami et al. |
| 6,515,593 B1 | 2/2003 | Stark et al. |
| 6,515,651 B1 | 2/2003 | Berstis |
| 6,522,292 B1 | 2/2003 | Ellenby et al. |

| | | |
|---|---|---|
| 6,526,411 B1 | 2/2003 | Ward |
| 6,539,232 B2 | 3/2003 | Hendrey et al. |
| 6,563,487 B2 | 5/2003 | Martin |
| 6,564,210 B1 | 5/2003 | Korda et al. |
| 6,572,511 B1 * | 6/2003 | Volpe ............... 482/4 |
| 6,598,707 B2 | 7/2003 | Nakagaki et al. |
| 6,607,493 B2 * | 8/2003 | Song ............... 600/502 |
| 6,618,593 B1 | 9/2003 | Drutman et al. |
| 6,623,427 B2 * | 9/2003 | Mandigo ............... 600/300 |
| 6,626,728 B2 | 9/2003 | Holt |
| 6,636,835 B2 | 10/2003 | Ragsdale-Elliott et al. |
| 6,640,187 B1 | 10/2003 | Chenault |
| 6,655,817 B2 | 12/2003 | Devlin |
| 6,657,116 B1 | 12/2003 | Gunnerson |
| 6,665,644 B1 | 12/2003 | Kanevsky et al. |
| 6,671,736 B2 | 12/2003 | Virine et al. |
| 6,680,675 B1 | 1/2004 | Suzuki |
| 6,686,531 B1 | 2/2004 | Pennock et al. |
| 6,686,911 B1 | 2/2004 | Levin |
| 6,697,044 B2 | 2/2004 | Shahoian |
| 6,697,048 B2 | 2/2004 | Rosenberg et al. |
| 6,781,289 B2 | 2/2004 | Levin |
| 6,721,706 B1 | 4/2004 | Strubbe et al. |
| 6,732,090 B2 | 5/2004 | Shanahan et al. |
| 6,735,568 B1 | 5/2004 | Buckwalter et al. |
| 6,741,929 B1 | 5/2004 | Oh et al. |
| 6,749,537 B1 | 6/2004 | Hickman |
| 6,765,495 B1 | 7/2004 | Dunning et al. |
| 6,768,066 B2 | 7/2004 | Wehrenberg |
| 6,768,246 B2 | 7/2004 | Pelrine |
| 6,772,026 B2 | 8/2004 | Bradbury et al. |
| 6,790,178 B1 | 9/2004 | Mault et al. |
| 6,801,837 B2 | 10/2004 | Carlstedt et al. |
| 6,804,643 B1 | 10/2004 | Kiss |
| 6,808,472 B1 | 10/2004 | Hickman |
| 6,808,473 B2 * | 10/2004 | Hisano et al. ............... 482/8 |
| 6,812,394 B2 | 11/2004 | Weissflog |
| 6,812,624 B1 | 11/2004 | Qibing |
| 6,822,635 B2 | 11/2004 | Shahoian |
| 6,829,599 B2 | 12/2004 | Chidlovskii |
| 6,852,251 B2 | 2/2005 | Sheng et al. |
| 6,858,970 B2 | 2/2005 | Malkin et al. |
| 6,863,220 B2 | 3/2005 | Selker |
| 6,863,641 B1 | 3/2005 | Brown et al. |
| 6,871,142 B2 | 3/2005 | Kumada et al. |
| 6,879,284 B2 | 4/2005 | Dufek |
| 6,882,086 B2 | 4/2005 | Kornbluh |
| 6,885,362 B2 | 4/2005 | Suomela |
| 6,888,457 B2 | 5/2005 | Wilkinson et al. |
| 6,906,533 B1 | 6/2005 | Yoshida |
| 6,906,643 B2 | 6/2005 | Samadani |
| 6,915,295 B2 | 7/2005 | Okamoto et al. |
| 6,917,373 B2 | 7/2005 | Vong et al. |
| 6,921,351 B1 | 7/2005 | Hickman |
| 6,929,481 B1 | 8/2005 | Alexander |
| 6,941,324 B2 | 9/2005 | Plastina et al. |
| 6,950,695 B2 | 9/2005 | Chen |
| 6,956,538 B2 | 10/2005 | Moore |
| 6,965,842 B2 | 11/2005 | Rekimoto |
| 6,970,088 B2 | 11/2005 | Kovach |
| 6,978,684 B2 | 12/2005 | Nurse |
| 6,982,697 B2 | 1/2006 | Wilson |
| 6,982,700 B2 | 1/2006 | Rosenberg et al. |
| 6,983,139 B2 | 1/2006 | Dowling et al. |
| 6,985,143 B2 | 1/2006 | Pharr |
| 6,986,320 B2 | 1/2006 | Shelton |
| 6,987,221 B2 | 1/2006 | Platt |
| 7,003,122 B2 * | 2/2006 | Chen ............... 381/67 |
| 7,007,001 B2 | 2/2006 | Oliver et al. |
| 7,012,593 B2 | 3/2006 | Yoon et al. |
| 7,023,423 B2 | 4/2006 | Rosenberg |
| 7,027,823 B2 | 4/2006 | Mikuni |
| 7,031,875 B2 | 4/2006 | Ellenby et al. |
| 7,039,521 B2 | 5/2006 | Hortner et al. |
| 7,044,891 B1 | 5/2006 | Rivera |
| 7,046,588 B2 | 5/2006 | Heo |
| 7,089,264 B1 | 8/2006 | Guido |
| 7,092,964 B1 | 8/2006 | Dougherty et al. |
| 7,100,835 B2 | 9/2006 | Selker |
| 7,133,767 B2 | 11/2006 | Ogino et al. |
| 7,136,945 B2 | 11/2006 | Gibbs et al. |
| 7,138,575 B2 | 11/2006 | Childs et al. |
| 7,156,773 B2 | 1/2007 | Takai et al. |
| 7,166,062 B1 | 1/2007 | Watterson et al. |
| 7,177,672 B2 * | 2/2007 | Nissila ............... 600/519 |
| 7,181,438 B1 | 2/2007 | Szabo |
| 7,186,270 B2 | 3/2007 | Elkins |
| 7,199,708 B2 | 4/2007 | Terauchi et al. |
| 7,199,800 B2 | 4/2007 | Ogawa |
| 7,207,935 B1 * | 4/2007 | Lipo ............... 600/28 |
| 7,225,565 B2 | 6/2007 | DiBenedetto et al. |
| 7,227,071 B2 | 6/2007 | Tagawa et al. |
| 7,229,416 B2 | 6/2007 | Chen |
| 7,232,416 B2 | 6/2007 | Czernicki |
| 7,249,126 B1 | 7/2007 | Ginsburg et al. |
| 7,283,997 B1 | 10/2007 | Howard et al. |
| RE39,906 E | 11/2007 | Roston et al. |
| 7,293,060 B2 | 11/2007 | Komsi |
| 7,310,676 B2 | 12/2007 | Bourne |
| 7,310,895 B2 | 12/2007 | Whittlesey et al. |
| 7,312,766 B1 | 12/2007 | Edwards |
| 7,312,785 B2 | 12/2007 | Tsuk et al. |
| 7,333,888 B2 | 2/2008 | Schoepp |
| 7,342,649 B2 | 3/2008 | Waibel |
| 7,344,508 B2 | 3/2008 | Surina |
| 7,348,967 B2 | 3/2008 | Zadesky et al. |
| 7,354,380 B2 | 4/2008 | Volpe, Jr. |
| 7,359,624 B2 | 4/2008 | Adams et al. |
| 7,373,820 B1 | 5/2008 | James |
| 7,394,405 B2 | 7/2008 | Godden |
| 7,460,953 B2 | 12/2008 | Herbst et al. |
| 7,489,979 B2 | 2/2009 | Rosenberg |
| 2001/0003542 A1 * | 6/2001 | Kita ............... 381/334 |
| 2001/0004622 A1 | 6/2001 | Alessandri |
| 2001/0020242 A1 | 9/2001 | Gupta |
| 2001/0041647 A1 | 11/2001 | Itoh et al. |
| 2002/0016786 A1 | 2/2002 | Pitkow et al. |
| 2002/0054060 A1 | 5/2002 | Schena |
| 2002/0059296 A1 | 5/2002 | Hayashi |
| 2002/0078045 A1 | 6/2002 | Dutta |
| 2002/0091049 A1 * | 7/2002 | Hisano et al. ............... 482/148 |
| 2002/0091796 A1 * | 7/2002 | Higginson et al. ............... 709/218 |
| 2002/0116476 A1 | 8/2002 | Eyal et al. |
| 2002/0133418 A1 | 9/2002 | Hammond et al. |
| 2002/0142701 A1 | 10/2002 | Rosenberg |
| 2002/0152077 A1 | 10/2002 | Patterson |
| 2002/0186221 A1 | 12/2002 | Bell |
| 2002/0198660 A1 | 12/2002 | Lutter et al. |
| 2003/0009497 A1 | 1/2003 | Yu |
| 2003/0011467 A1 | 1/2003 | Suomela |
| 2003/0018527 A1 | 1/2003 | Filepp |
| 2003/0033287 A1 | 2/2003 | Shanahan et al. |
| 2003/0041105 A1 | 2/2003 | Patrick |
| 2003/0047683 A1 | 3/2003 | Kaushal |
| 2003/0069077 A1 | 4/2003 | Korienek |
| 2003/0074130 A1 | 4/2003 | Negishi et al. |
| 2003/0076301 A1 | 4/2003 | Tsuk et al. |
| 2003/0089218 A1 | 5/2003 | Gang et al. |
| 2003/0110038 A1 | 6/2003 | Sharma |
| 2003/0115193 A1 | 6/2003 | Okamoto et al. |
| 2003/0132301 A1 | 7/2003 | Selker |
| 2003/0135490 A1 | 7/2003 | Barrett et al. |
| 2003/0156019 A1 | 8/2003 | Lehmann |
| 2003/0182052 A1 | 9/2003 | DeLorme et al. |
| 2003/0187837 A1 | 10/2003 | Cutliss |
| 2003/0193572 A1 | 10/2003 | Wilson |

| | | |
|---|---|---|
| 2003/0195884 A1 | 10/2003 | Boyd et al. |
| 2003/0208315 A1 | 11/2003 | Mays |
| 2003/0210806 A1 | 11/2003 | Yoichi et al. |
| 2003/0217007 A1 | 11/2003 | Fukushima |
| 2003/0220917 A1 | 11/2003 | Copperman et al. |
| 2003/0236582 A1 | 12/2003 | Zamir et al. |
| 2004/0012506 A1 | 1/2004 | Fujiwara |
| 2004/0015714 A1 | 1/2004 | Abraham et al. |
| 2004/0017482 A1 | 1/2004 | Weitman |
| 2004/0019588 A1 | 1/2004 | Doganata et al. |
| 2004/0025563 A1 | 2/2004 | Stierle |
| 2004/0068486 A1 | 4/2004 | Chidlovskii |
| 2004/0097806 A1 | 5/2004 | Hunter |
| 2004/0102684 A1 | 5/2004 | Kawanishi et al. |
| 2004/0103087 A1 | 5/2004 | Mukherjee et al. |
| 2004/0114129 A1 | 6/2004 | Gogolla |
| 2004/0124248 A1 | 7/2004 | Selker |
| 2004/0125073 A1* | 7/2004 | Potter et al. ................ 345/156 |
| 2004/0164971 A1 | 8/2004 | Hayward |
| 2004/0166937 A1 | 8/2004 | Rothschild |
| 2004/0186824 A1 | 9/2004 | Delic et al. |
| 2004/0193372 A1 | 9/2004 | MacNeille et al. |
| 2004/0204240 A1 | 10/2004 | Barney |
| 2004/0215469 A1 | 10/2004 | Fukushima |
| 2004/0219961 A1 | 11/2004 | Ellenby |
| 2004/0224638 A1 | 11/2004 | Fadell et al. |
| 2004/0225519 A1 | 11/2004 | Martin |
| 2004/0248653 A1 | 12/2004 | Barros |
| 2004/0252397 A1 | 12/2004 | Hodge et al. |
| 2005/0012611 A1 | 1/2005 | Osman |
| 2005/0021470 A1 | 1/2005 | Martin et al. |
| 2005/0039206 A1 | 2/2005 | Opdycke |
| 2005/0049113 A1* | 3/2005 | Yueh et al. .................... 482/8 |
| 2005/0071328 A1 | 3/2005 | Lawrence et al. |
| 2005/0080786 A1 | 4/2005 | Fish |
| 2005/0088318 A1 | 4/2005 | Liu et al. |
| 2005/0096047 A1 | 5/2005 | Haberman et al. |
| 2005/0107218 A1 | 5/2005 | Chuang et al. |
| 2005/0107688 A1 | 5/2005 | Strommer |
| 2005/0126370 A1* | 6/2005 | Takai et al. .................. 84/636 |
| 2005/0129253 A1* | 6/2005 | Chen .......................... 381/67 |
| 2005/0130802 A1 | 6/2005 | Kinnunen et al. |
| 2005/0134479 A1 | 6/2005 | Isaji |
| 2005/0139660 A1 | 6/2005 | Maxymych et al. |
| 2005/0141729 A1* | 6/2005 | Kanzaki et al. ............... 381/67 |
| 2005/0143173 A1 | 6/2005 | Barney et al. |
| 2005/0149213 A1 | 7/2005 | Guzak et al. |
| 2005/0149499 A1 | 7/2005 | Franz et al. |
| 2005/0154636 A1 | 7/2005 | Hildinger et al. |
| 2005/0174975 A1 | 8/2005 | Mgrdechian et al. |
| 2005/0182564 A1 | 8/2005 | Kim |
| 2005/0184878 A1 | 8/2005 | Grold et al. |
| 2005/0197237 A1 | 9/2005 | Chen |
| 2005/0197771 A1 | 9/2005 | Seick et al. |
| 2005/0210419 A1 | 9/2005 | Kela et al. |
| 2005/0212749 A1 | 9/2005 | Marvit et al. |
| 2005/0222981 A1 | 10/2005 | Lawrence et al. |
| 2005/0222989 A1 | 10/2005 | Haveliwala et al. |
| 2005/0233859 A1 | 10/2005 | Takai et al. |
| 2005/0233861 A1 | 10/2005 | Hickman et al. |
| 2005/0234638 A1 | 10/2005 | Ogaki |
| 2005/0240342 A1 | 10/2005 | Ishihara |
| 2005/0251576 A1 | 11/2005 | Weel |
| 2005/0261609 A1 | 11/2005 | Collings et al. |
| 2005/0266961 A1 | 12/2005 | Shum et al. |
| 2005/0275514 A1 | 12/2005 | Roberts |
| 2005/0278317 A1 | 12/2005 | Gross et al. |
| 2005/0286546 A1 | 12/2005 | Basseli et al. |
| 2006/0004512 A1 | 1/2006 | Herbst et al. |
| 2006/0017692 A1 | 1/2006 | Wehrenberg et al. |
| 2006/0020177 A1 | 1/2006 | Seo et al. |
| 2006/0022955 A1 | 2/2006 | Kennedy |
| 2006/0026521 A1 | 2/2006 | Hotelling et al. |
| 2006/0052132 A1 | 3/2006 | Naukkarinen |
| 2006/0060068 A1* | 3/2006 | Hwang et al. .................. 84/615 |
| 2006/0079800 A1 | 4/2006 | Martikka et al. |
| 2006/0084551 A1* | 4/2006 | Volpe, Jr. ...................... 482/8 |
| 2006/0089798 A1 | 4/2006 | Kaufman et al. |
| 2006/0095412 A1 | 5/2006 | Zito et al. |
| 2006/0097991 A1 | 5/2006 | Hotelling et al. |
| 2006/0098772 A1 | 5/2006 | Reho et al. |
| 2006/0101377 A1 | 5/2006 | Toyama et al. |
| 2006/0102171 A1* | 5/2006 | Gavish ....................... 128/95.1 |
| 2006/0107822 A1* | 5/2006 | Bowen ........................ 84/612 |
| 2006/0111621 A1* | 5/2006 | Coppi et al. ................. 600/300 |
| 2006/0136173 A1 | 6/2006 | Case et al. |
| 2006/0161621 A1 | 7/2006 | Rosenberg |
| 2006/0164382 A1* | 7/2006 | Kulas et al. .................. 345/156 |
| 2006/0167576 A1 | 7/2006 | Rosenberg |
| 2006/0167943 A1 | 7/2006 | Rosenberg |
| 2006/0169125 A1* | 8/2006 | Ashkenazi et al. ............ 84/612 |
| 2006/0173828 A1 | 8/2006 | Rosenberg |
| 2006/0173837 A1 | 8/2006 | Berstis et al. |
| 2006/0188109 A1 | 8/2006 | Makino et al. |
| 2006/0189386 A1 | 8/2006 | Rosenberg |
| 2006/0195361 A1 | 8/2006 | Rosenberg |
| 2006/0229163 A1 | 10/2006 | Waters |
| 2006/0243120 A1* | 11/2006 | Takai et al. .................... 84/612 |
| 2006/0253210 A1* | 11/2006 | Rosenberg .................... 700/94 |
| 2006/0256082 A1* | 11/2006 | Cho et al. .................... 345/156 |
| 2006/0276919 A1* | 12/2006 | Shirai et al. ................... 700/94 |
| 2006/0288846 A1* | 12/2006 | Logan ......................... 84/612 |
| 2007/0021269 A1 | 1/2007 | Shum |
| 2007/0027000 A1* | 2/2007 | Shirai et al. ..................... 482/8 |
| 2007/0044641 A1* | 3/2007 | McKinney et al. ............. 84/612 |
| 2007/0060446 A1* | 3/2007 | Asukai et al. ................... 482/8 |
| 2007/0067294 A1 | 3/2007 | Ward et al. |
| 2007/0074618 A1* | 4/2007 | Vergo ........................... 84/612 |
| 2007/0074619 A1* | 4/2007 | Vergo ........................... 84/612 |
| 2007/0079691 A1* | 4/2007 | Turner .......................... 84/612 |
| 2007/0103431 A1* | 5/2007 | Tabatowski-Bush ........ 345/156 |
| 2007/0113725 A1* | 5/2007 | Oliver et al. .................... 84/612 |
| 2007/0125852 A1 | 6/2007 | Rosenberg |
| 2007/0135264 A1 | 6/2007 | Rosenberg |
| 2007/0145680 A1* | 6/2007 | Rosenberg ................ 273/138.1 |
| 2007/0156676 A1 | 7/2007 | Rosenberg |
| 2007/0156677 A1 | 7/2007 | Szabo |
| 2007/0173377 A1 | 7/2007 | Jamsen et al. |
| 2007/0174416 A1* | 7/2007 | Waters et al. ................ 709/217 |
| 2007/0198182 A1 | 8/2007 | Singh |
| 2007/0236493 A1 | 10/2007 | Horiuchi |
| 2007/0271228 A1 | 11/2007 | Querel |
| 2008/0005075 A1 | 1/2008 | Horvitz et al. |
| 2008/0016040 A1 | 1/2008 | Jones et al. |
| 2008/0016218 A1 | 1/2008 | Jones et al. |
| 2008/0147217 A1* | 6/2008 | Chung et al. ................... 700/94 |

FOREIGN PATENT DOCUMENTS

| | | |
|---|---|---|
| EP | 0083126 | 7/1983 |
| WO | WO-02073818 | 9/2002 |
| WO | PCT/US2006/004373 A1 | 8/2006 |
| WO | WO-2006086439 | 8/2006 |

OTHER PUBLICATIONS

Oguro, K et al., "Polymer Electrolyte Actuator with Gold Electrodes", *SPIE Conference on Electroactive Polymer Actuators and Devices, SPEE* vol. 3669, 1999.

Rosenberg, "U.S. Appl. No. 11/619,607", filed Jan. 3, 2007.

Rosenberg, "U.S. Appl. No. 11/341,948", filed Jan. 27, 2006.

Rosenberg, "U.S. Appl. No. 11/683,394", filed Mar. 7, 2007.

Rosenberg, "U.S. Appl. No. 11/344,613", filed Jan. 31, 2006.

Rosenberg, "U.S. Appl. No. 11/682,874", filed Mar. 6, 2007.

Rosenberg, "U.S. Appl. No. 11/278,531", filed Apr. 3, 2006.

Rosenberg, "U.S. Appl. No. 11/697,704", filed Apr. 6, 2007.

Sharper Image, "Laser Baseball", Item # PS115: downloaded from www.sharperimage.com on Dec. 9, 2005, 18 pages.
Rosenberg, "U.S. Appl. No. 11/610,615", filed May 10, 2007.
Rosenberg, "U.S. Appl. No. 11/677,045", filed Feb. 20, 2007.
Rosenberg, "U.S. Appl. No. 11/619,605", filed Jan. 3, 2007.
Rosenberg, "U.S. Appl. No. 11/610,494", filed Dec. 13, 2006.
Rosenberg, "U.S. Appl. No. 11/562,036", filed Nov. 21, 2006.
Rosenberg, "U.S. Appl. No. 11/282,379", filed Aug. 17, 2006.
Rosenberg, "U.S. Appl. No. 11/298,797", filed Aug. 3, 2006.
Rosenberg, "U.S. Appl. No. 11/341,021", filed Aug. 3, 2006.
Rosenberg, "U.S. Appl. No. 11/383,197", filed Aug. 31, 2006.
Reinhold, Ross "Applications of Myers-Briggs Type Indicator, Personality Type", available at http://www.personalitypathways.com/ last visited Jun. 15, 2007.
"Human Metrics: Jung Typology Test", available at: http://www.humanmetrics.com/cgi-win/JTypes2.asp last visited Jun. 15, 2007.
Rosenberg, "U.S. Appl. No. 11/246,050", filed Feb. 8, 2007.
Rosenberg, "U.S. Appl. No. 11/260,000", filed Oct. 26, 2005.
Rosenberg, "U.S. Appl. No. 11/299,096", filed Dec. 9, 2005.
Rosenberg, "U.S. Appl. No. 11/315,762", filed Dec. 21, 2005.
Rosenberg, "U.S. Appl. No. 11/341,025", filed Jan. 27, 2006.
Rosenberg, "U.S. Appl. No. 11/383,195", filed May 12, 2006.
Rosenberg, "U.S. Appl. No. 11/422,065", filed Aug. 24, 2006.
Rosenberg, "U.S. Appl. No. 11/425,981", filed Jun. 22, 2007.
Rosenberg, "U.S. Appl. No. 11/428,341", filed Oct. 12, 2006.
Wu and Childers, "Gender Recognition from Speech Part I: Coarse Analysis", (1991).
Wu and Childers, "Gender Recognition from Speech Part II: Fine Analysis", (1991).
Brin and Page, "The Anatomy of a Large-Scale Hypertextual Search Engine", Stanford University, 1998.
Hayashi, J et al., "A Method for Estimating and Modeling Age and Gender Using Facial Image Processing", (2001).
Schotz, "Automatic prediction of speaker age using CART", (2003).
Castrillon, et al., "Identity and Gender Recognition Using the ENCARA Real-Time Face Detector", *CAEPIA*, (Nov. 2003).
"www.wwmx.org", First visited in May 2005.
Office Action from U.S. Appl. No. 11/282,379 dated Sep. 18, 2007.
Kornbluh, et al., "High-field Electrostriction of Elastomeric Polymer Dielectrics for Actuation", *SPIE Conference on Electroactive Polymer Actuators and Devices*, (Mar. 1999).
Kawahara, et al., "Designing a Universal Remote Control for the Ubiquitous Computing Environment", *EE Times*, 2003.
Abrial, et al., "A New Contactless Smartcard IC Using an On-Chip Antenna and an Asynchronous Micro-controller", (2001).
Rosenberg, "U.S. Appl. No. 11/341,100", filed Jan. 27, 2006.
Rosenberg, "U.S. Appl. No. 11/278,120", filed Oct. 5, 2006.
Morhring, et al., "Video See-Through AR on Consumer Cell-Phones", (Mar. 2004).
Gordon, et al., "Silicon Optical Navigation", (2003).
"Remotely Operated Vehicles Seaeye Falcon", www.roper-resources.com, (May. 2002).
"Remotely Operated Vehicle", www.seabotix.com/products/lbv150.htm, (Dec. 2001).
"Unmanned Aircraft Systems", www.baiaerosystems.com, (1985).
"www.gesturetek.com", (Jul. 1996).
"www.reactrix.com", (2002).

Office Action from U.S. Appl. No. 11/422,065 dated Mar. 28, 2007.
Office Action from U.S. Appl. No. 11/422,065 dated Aug. 31, 2007.
Rosenberg, "U.S. Appl. No. 11/749,134", filed May 15, 2007.
Rosenberg, "U.S. Appl. No. 11/749,137", filed May 15, 2007.
Rosenberg, "U.S. Appl. No. 11/762,017", filed Oct. 4, 2007.
Rosenberg, "U.S. Appl. No. 11/772,803", filed Jul. 12, 2007.
Rosenberg, "U.S. Appl. No. 11/846,530", filed Aug. 29, 2007.
Rosenberg, "U.S. Appl. No. 11/851,340", filed Sep. 6, 2007.
Rosenberg, "U.S. Appl. No. 11/841,868", filed Aug. 20, 2007.
Rosenberg, "U.S. Appl. No. 11/461,375", filed Nov. 9, 2006.
Rosenberg, "U.S. Appl. No. 11/555,784", filed May 24, 2007.
Rosenberg, "U.S. Appl. No. 11/563,610", filed Jun. 28, 2007.
Rosenberg, "U.S. Appl. No. 11/697,706", filed Aug. 16, 2007.
Rosenberg, "U.S. Appl. No. 11/618,858", filed Jun. 14, 2007.
Rosenberg, "U.S. Appl. No. 11/676,298", filed Jul. 5, 2007.
Rosenberg, "U.S. Appl. No. 11/697,732", filed Apr. 8, 2007.
Rosenberg, "U.S. Appl. No. 11/744,879", filed Sep. 20, 2007.
Rosenberg, "U.S. Appl. No. 11/775,314", filed Jul. 30, 2007.
"Bodybug Calorie Management System", downloaded from www.ubergizom.com/15/archives/2005/03/boddybug_calori.html on Jul. 9, 2007, (Mar. 18, 2005).
"www.fitlinxx.com", downloaded from www.fitlinxx.com/brand/about_tour3.htm on Jul. 9, 2007, (2003).
"YMCA", downloaded from www.ymcamidpen.org/textpage.php?b=2&p=fitlinxx on Jul. 10, 2007, (2003).
Demartini, Marilyn "Cyber Fitness", downloaded from www.physicalmag.com/articlesTemp.as?dept=14 &articleID=1812 on Jul. 10, 2007, (Feb. 18, 2001).
Munro, Aria "eNewsChannels", downloaded from enewschannels.com/20070106enc582-025321.php on Aug. 5, 2007, (Jul. 1, 2007).
Oliver, Nuria et al., "Enhancing Exercise Performance through Real-time Phsiological Monitoring and Music: A User Study", *Proceedings of Pervasive Health 2006*. Innsbruck, Austria. Nov. 2006, et all = Lucas Kreger-Stckles.
Betlyon, Jim "Omni Fitness Equipment Stores Integrate Physical Genius Online Fitness Tools", downloaded from www.physicalgenius.com on Aug. 5, 2007, (Apr. 19, 2000).
"Tune Your Run", Apple Computer/Nike, downloaded from www.apple.com on Jun. 28, 2006.
Nintendo, "Kirby's Tilt N' Tumble", downloaded from www.nintendo.com; Nov. 14, 2006: 2 pages.
Cook, Perry et al., "Using DSP-Based Parametric Physical Syntheses Models to Study Human Sound Perception", *2003 IEEE Workshop on Applications of Signal Processing to Audio and Acoustics*, (2003).
"Yahoo media player", downloaded from www.yahoo.com on Sep. 19, 2006. Not admitted as prior art.
McKinney and Moelants, "Extracting the Perceptual Tempo from Music", *published at the ISMIR 2004 5th International Conference on Music Information Retrieval*, (2004).
"PCDJ Red Virtual Rack Module", by Visiosonic of Clearwater, FL. Downloaded from www.visiosonic.com on Jun. 27, 2006.
"Beat rates per minute", downloaded from www.bpmlist.com on Jun. 27, 2006. Lulu Publishing. ISBN 1-4116-4211-2, (Jun. 27, 2006).
Metzger, Christian et al., "FreeDigiter: A Contact-free Device for Gesture Control", *IEEE 8th International Symposium on Wearable Computers*, (Nov. 4, 2004).

"Jukebox Without Quarters", *Business Opportunities Weblog*, http://www.business-opportunities.bix/2007/03/30/jukebox-without-quarters/, cited Mar. 30, 2007, printed May 22, 2007, (May 30, 2007),2 pages.
Rosenberg, "U.S. Appl. No. 11/551,702", filed Oct. 20, 2006.
Office Action from U.S. Appl. No. 11/298,797 dated Jan. 9, 2008.
Rosenberg, Louis "Virtual Fixtures: perceptual Overlays Enchance Operator Performance in Telepresence Tasks", *Ph.D. Dissertation*, Stanford University, (Jun. 1994).
Rosenberg, Louis "A force Feedback Programming Primer", *Immersion Corporation*, (1997).
"www.confluence.org", first visited May 2005.
Rosenberg, "U.S. Appl. No. 11/772,808", filed Jul. 2, 2007.
Rosenberg, "U.S. Appl. No. 11/223,368", filed Sep. 9, 2005.
Rosenberg, "U.S. Appl. No. 11/285,534", filed Nov. 22, 2005.
Rosenberg, "U.S. Appl. No. 11/533,037", filed Sep. 19, 2006.
Castelli, et al., "Habitat Telemonitoring System Based on the Sound Surveillance", et al = Vacher, Istrate, Besacier and Serignat.
Martin, Keith D., "Sound-Source Recognition: A Theory and Computational Model", *1999 doctoral dissertation from MIT*, (1999).
Casey, Michael "MPEG-7 Sound-Recognition Tools", *IEEE Transactions on Circuits and Systems for Video Technology*, vol. 11, No. 6, Jun. 2001.
Lumia, R et al., "Microgripper design using electo-active polymers", *SPIE Conference on Electroactive Polymer Actuators and Devices, SPEE* vol. 3669, 1999, (Mar. 1999).
Rosenberg, "U.S. Appl. No. 11/367,178", filed Mar. 2, 2006.
Rosenberg, "U.S. Appl. No. 11/298,434", filed Dec. 9, 2005.
Rosenberg, "U.S. Appl. No. 11/354,667", filed Feb. 14, 2006.
Rosenberg, "U.S. Appl. No. 11/427,320", filed Jun. 28, 2006.
McCarthy, Michael "Adidas puts computer on new footing", *USA Today*, Mar. 2, 2005.
Brooks Sports, "Hydroflow Footwear", www.brooksrunninq.co.uk, 1989.
Rosenberg, "U.S. Appl. No. 11/271,172", filed Nov. 10, 2005.
Miastkowski, Stan "How it Works: Speech Recognition", *PC World*, Apr. 14, 2000, pp. 1-5.
Rosenberg, "U.S. Appl. No. 11/267,079", filed Nov. 3, 2005.
McKinney and Moelants, et al., "Deviations from the Resonance Theory of Temp Induction", *published at the Conference on Interdisciplinary Musicology*, et al = Dirk Moelands,(2004).
Rosenberg, "U.S. Appl. No. 11/626,355", filed Jan. 23, 2007.
Rosenberg, "U.S. Appl. No. 11/561,981", filed Nov. 21, 2006.
Rosenberg, "U.S. Appl. No. 11/535,417", filed Sep. 26, 2006.
Murray, et al., "Underwater Teleroboticsa and Virtual Reality: A New Partnership", *NCCOSC RDT&E Division*; Jun. 20, 1996; pp. 1-10; San Diego, CA.
Rosenberg, "U.S. Appl. No. 11/427,325", filed Jun. 28, 2006.
Rosenberg, "U.S. Appl. No. 11/610,499", filed Dec. 13, 2006.
Rosenberg, "U.S. Appl. No. 11/315,755", filed Dec. 21, 2005.
Rosenberg, "U.S. Appl. No. 11/344,612", filed Nov. 16, 2006.
Rosenberg, "U.S. Appl. No. 11/344,701", filed Jan. 31, 2006.
Rosenberg, "U.S. Appl. No. 11/425,990", filed Jun. 22, 2006.
Spohrer, "Information in Places", *IBM Systems Journal*; 1999; pp. 602-628; vol. 38, No. 4.
Rosenberg, "U.S. Appl. No. 11/539,598", filed Oct. 6, 2006.
Rosenberg, "U.S. Appl. No. 11/285,534", filed Nov. 22, 2005.
Office Action from U.S. Appl. No. 11/315,762 dated Jan. 29, 2008.
Office Action from U.S. Appl. No. 11/344,701 dated Jan. 24, 2008.
Office Action from U.S. Appl. No. 11/422,065 dated Jan. 28, 2008.
Office Action from U.S. Appl. No. 11/383,195 dated Mar. 19, 2008.
Office Action from U.S. Appl. No. 11/344,612 dated Apr. 8, 2008.
Office Action from U.S. Appl. No. 11/341,021 dated Jan. 18, 2008.
"Total Immersion" *D'Fusion Software*, 2004.
Anonymous, "Social Search", Wikipedia.com Jan. 23, 2008.
Ciger, et al., "The magic wand", *In: Proceedings of Spring Conference on Computer Graphics 2003*, Budmerice, Slovak Republic 2003 , 132-8.
Finkelstein, Lev, "Placing Search in Context: The Concept Revisted", *Zapper Technologies* May 5, 2001.
Hernandez, Jose L. et al., "A New Instrumented Approach For Translating American Sign Language Into Sound And Text", *IEEE International Conference on Face and Gesture Recognition 2004*, Seoul, Korea, May 2004.
Hernandez-Rebollar, et al., "A Multi-Class Pattern Recognition System for Practical Finger Spelling Translation", *Proceedings of International Conference on Multimodal Interfaces, IEEE* 2002, 185-190.
Kramer, J. et al., "The Talking Glove: Expressive and Receptive Verbal Communication Aid for the Deaf, Deaf-Blind, and Nonvocal", *SIGCAPH 39* Spring 1988, 12-15.
Rosenberg, Louis B., "U.S. Appl. No. 11/367,178".
Sullivan, Danny, "Eurekster Launches Personalized Social Search", *SearchEngineWatch.com Online Newsletter* Jan. 24, 2004.
U.S.P.T.O., Office Action from U.S. Appl. No. 11/285,534 mailed Jul. 21, 2008.
U.S.P.T.O., Office Action from U.S. Appl. No. 11/267,079 mailed Jul. 17, 2008.
U.S.P.T.O., Office Action from U.S. Appl. No. 11/427,320 mailed Jul. 23, 2008.
U.S.P.T.O., Office Action from U.S. Appl. No. 11/341,021 mailed Aug. 14, 2008.
U.S.P.T.O., Office Action from U.S. Appl. No. 11/315,762 mailed Aug. 12, 2008.
U.S.P.T.O., Non-Final Office Action from U.S. Appl. No. 11/427,325 mailed Sep. 24, 2008.
U.S.P.T.O., Non-Final Office Action from U.S. Appl. No. 11/341,025 mailed Sep. 24, 2008.
U.S.P.T.O., Examiner Interview Summary for U.S. Appl. No. 11/246,050 mailed Sep. 30, 2008.
U.S.P.T.O., Non Final Office Action for U.S. Appl. No. 11/315,755 mailed Sep. 30, 2008.
U.S.P.T.O., Final Office Action from U.S. Appl. No. 11/383,195 mailed Oct. 15, 2008.
U.S.P.T.O., Office Action from U.S. Appl. No. 11/282,379 mailed May 30, 2008.
U.S.P.T.O., Office Action from U.S. Appl. No. 11/298,797 mailed Jun. 25, 2008.
U.S.P.T.O., Office Action from U.S. Appl. No. 11/618,858 mailed Jul. 9, 2008.

U.S.P.T.O., Office Action from U.S. Appl. No. 11/246,050 mailed Jul. 9, 2008.
U.S.P.T.O, Notice of Allowance for U.S. Appl. No. 11/285,534 mailed Nov. 19, 2008.
U.S.P.T.O, Examiner Interview for U.S. Appl. No. 11/285,534 mailed Nov. 19, 2008.
U.S.P.T.O, Non Final Office Action for U.S. Appl. No. 11/610,499 mailed Dec. 19, 2008.
U.S.P.T.O, Non Final Office Action from U.S. Appl. No. 11/223,368 mailed Dec. 24, 2008.
U.S.P.T.O, Notice of Allowance for U.S. Appl. No. 11/246,050 mailed Jan. 8, 2009.
U.S.P.T.O., Non Final Office Action from U.S. Appl. No. 11/775,314 mailed Oct. 29, 2008.
Non Final Office Action from U.S. Appl. No. 11/610,494 mailed Jan. 26, 2009.
Non Final Office Action for U.S. Appl. No. 11/846,530 mailed Feb. 19, 2009.
Examiner Interview Summary from U.S. Appl. No. 11/315,762 mailed Feb. 25, 2009.
Notice of Allowance from U.S. Appl. No. 11/267,079 mailed Feb. 24, 2009.
Examiner Interview Summary from U.S. Appl. No. 11/267,079 mailed Feb. 24, 2009.
Non Final Office Action from U.S. Appl. No. 11/683,394 mailed Mar. 3, 2009.

* cited by examiner

SHAKE RESPONSIVE PORTABLE MEDIA PLAYER

CROSS-REFERENCE TO RELATED APPLICATIONS

This application is a non-provisional application claiming benefit and priority under 35 U.S.C. § 119(e) from applicant's U.S. provisional application Ser. No. 60/739,313, filed on Nov. 23, 2005 to a common assignee and the instant inventor; this application is also a continuation in part of co-pending U.S. patent application Ser. Nos. 11/461,375 filed on Jul. 31, 2006; Ser. No. 11/267,079 filed on Nov. 3, 2005; Ser. No. 11/246,050 filed on Oct. 7, 2005; Ser. No. 11/466,381 filed on Aug. 22, 2006; Ser. No. 11/285,534 filed on Nov. 22, 2005; and Ser. No. 11/427,320 filed on Jun. 28, 2006, all to a common assignee and the instant inventor; all of the aforementioned patents applications are hereby incorporated by reference in their entirety.

FEDERALLY SPONSORED RESEARCH AND DEVELOPMENT

Not Applicable

REFERENCE TO A MICROFICHE APPENDIX

Not Applicable

FIELD OF INVENTION

The present inventive embodiments relates generally to automated selection and arrangement of media items, and more specifically to an apparatus, method and computer program product for automatically selecting, and playing of a media item in dependence on a characteristic shaking motion.

BACKGROUND

Electronic Media Players have become popular personal entertainment devices due to their highly portable nature and interconnectivity with existing computer networks, for example the Internet. The accessibility and simplicity in downloading music and other electronic media continues to fuel the popularity of these devices as is exemplified by Apple Computer, Inc.'s highly successful iPod™ portable media player. Recent models also allow for the storage and display of personal photos allowing users to carry about a photo album stored in memory of the portable media player. Other manufacturers have competing Media Players offering various functionalities and file playing compatibilities in an effort to differentiate their products in the marketplace.

As discussed in Apple Computer, Inc., patent application, US 2004/0224638 A1, Ser. No. 10/423,490 to Fadell, et al., which is herein incorporated by reference in its entirety; an increasing number of consumer products are incorporating circuitry to play musical media files and other electronic media.

For example, many portable electronic devices such as cellular telephones and personal digital assistants (PDAs) include the ability to play electronic musical media in many of the most commonly available file formats including MP3, AVI, WAV, MPG, QT, WMA, AIFF, AU, RAM, RA, MOV, MIDI, etc. In the relevant art, portable media players enable users to select media items either manually from memory and/or provide user configurable playlists by which media items may be selected automatically from the memory and outputted to the user.

However, the user may wish that this playlist selection be accomplished automatically based upon a randomized and/or semi-randomized routine that is performed by the processor of the portable media player. In addition, a simple, intuitive and non-intrusive mechanism for rearranging and/or changing of the automatically selected media items is lacking in the relevant art. Therefore, what is needed is a convenient, natural, fun, and satisfying mechanism that allows a user to indicate his or her desire that the portable media player, using a random or semi-random routines, to automatically select and output new media items, automatically re-order the media items in a play list stored in memory, and/or automatically populate or re-populate a play list with changed media items selected from memory.

Furthermore, a convenient, natural, fun, and satisfying user interface method and apparatus that allows a user to indicate a desired level or magnitude of the randomization and/or re-ordering and/or re-populating process to be performed by the portable media player.

SUMMARY

The various embodiments described herein address the limitations in the relevant art and provides mechanisms which allows a user to indicate a desired level or magnitude of randomization, re-ordering and/or re-populating of a play arrangement on a portable media player in dependence on detected characteristic shaking motions. In an exemplary apparatus embodiment, a shake responsive portable media player is provided. The portable media player comprises a processor; a memory functionally coupled to the processor; a motion sensor functionally coupled to the processor and configured to detect shaking motions imparted on the portable media player by a user; and a control program operatively loaded into the memory coupled to the processor. The control programs including instructions executable by the processor to; identify deliberately imparted characteristic shaking motions from the detected shaking motions; and change a play arrangement in dependence on the identified characteristic shaking motions.

In a first related exemplary apparatus embodiment, the motion sensor is an accelerometer.

In a second related exemplary apparatus embodiment, the characteristic shaking motions is identified by the control program based at least in part on one or more of; frequency, magnitude, time duration, and any combination thereof.

In a third related exemplary apparatus embodiment, the control program further includes instructions executable by the processor to determine if the detected characteristic shaking motion exceeds one or more; a predefined magnitude threshold, a predefined time duration threshold and a combination thereof.

In a fourth related exemplary apparatus embodiment, the play arrangement is one or more of; a predefined playlist of media items, a randomly generated playlist of media items, and at least one randomly selected media item.

In a fifth related exemplary apparatus embodiment, the change in the play arrangement is one or more of; shuffling an order of media items in the predefined playlist, generating another randomized playlist of media items, randomly selecting another media item for play and any combination thereof.

In a sixth related exemplary apparatus embodiment, an extent of the change in the play arrangement is dependent at least in part upon a duration of the characteristic shaking motions.

In a seventh related exemplary apparatus embodiment, the extent of the change in the play arrangement is dependent upon a magnitude of the characteristic shaking motions.

In an eighth related exemplary apparatus embodiment, the media items are musical media files.

In a ninth related exemplary apparatus embodiment, the characteristic shaking motions is identified based at least in part upon an amplitude of the detected shaking motions that falls within a predefined bounds for more than a minimum time duration.

In a tenth related exemplary apparatus embodiment, the random selection of the media item is completed after a cessation of the identified characteristic shaking motions.

In an eleventh related exemplary apparatus embodiment, play of the randomly selected media item occurs after cessation of the identified characteristic shaking motions.

In a twelfth related exemplary apparatus embodiment, the control program further includes instructions executable by the processor to output a human cognizable representation concurrent with the change in the play arrangement.

In a thirteenth related exemplary apparatus embodiment, the human cognizable representation is one or more of; a characteristic sound, a characteristic visual display and any combination thereof.

In a fourteenth related exemplary apparatus embodiment, the media item is a representation of one or more of; a song, a cartoon, an axiom, a saying, a fact, a joke, a puzzle and a trivia question.

In an exemplary methodic embodiment, a shake responsive portable media player is provided. The method comprising: functionally coupling a motion sensor to a processor associated with the portable media player; configuring the motion sensor to detect shaking motions imparted on the portable media player by a user; and operatively loading into a memory coupled to the processor, a control program including instructions executable by the processor for identifying deliberately imparted characteristic shaking motions from the detected shaking motions and for changing a play arrangement in dependence on the identified characteristic shaking motions.

In a first related exemplary methodic embodiment, the control program further includes instructions executable by the processor for determining if the detected shaking motions exceeds one or more of; a predefined magnitude threshold, a predefined time duration threshold and any combination thereof.

In a second related exemplary methodic embodiment, changing a play arrangement includes one or more of; shuffling an order of media items in a predefined playlist, generating another randomized playlist of media items, randomly selecting another media item for play and any combination thereof.

In a third related exemplary methodic embodiment, the control program further includes instructions executable by the processor for varying an extent of the change in the play arrangement in at least partial dependence on a duration of the identified characteristic shaking motions.

In a fourth related exemplary methodic embodiment, the control program further including instructions executable by the processor for varying the extent of the change in the play arrangement in further dependence on a magnitude of the identified characteristic shaking motions.

In a fifth related exemplary methodic embodiment, randomly selecting the media item may be performed after a cessation of the identified characteristic shaking motions.

In a sixth related exemplary methodic embodiment, the control program further including instructions executable by the processor for playing the randomly selected media item after cessation of identified characteristic shaking motions.

In a seventh related exemplary methodic embodiment, the control program further including instructions executable by the processor for outputting a human cognizable representation concurrently with changing the play arrangement.

In an eighth related exemplary methodic embodiment, the human cognizable representation includes one or more of; a characteristic sound, a characteristic visual display and any combination thereof.

In an exemplary computer program product (CPP) embodiment, a computer program embodied in a tangible form is provided. The program comprises instructions executable by a processor associated with the portable media player to change a play arrangement in dependence identified characteristic shaking motions determined from shaking motions detected by a motion sensor coupled to the processor.

In first related exemplary CPP embodiment, further instructions executable by the processor are provided for identifying the characteristic shaking motions based at least in part upon the detected shaking motions exceeding one or more of; a predefined magnitude threshold, a predefined time duration threshold, and a combination thereof.

In a second related exemplary CPP embodiment, the change in the play arrangement includes one or more of; shuffling an order of media items in a predefined playlist, generating another randomized playlist of media items, randomly selecting another media item for play and any combination thereof.

In a third related exemplary CPP embodiment, further instructions executable by the processor are provided for varying an extent of the change in the play arrangement in at least partial dependence on a duration of a detected characteristic shaking motion.

In a fourth related exemplary CPP embodiment, further instructions executable by the processor are provided for varying the extent of the change in the play arrangement in further dependence on a magnitude of a detected characteristic shaking motion.

In a fifth related exemplary CPP embodiment, the tangible form includes one or more of; a logical media, a magnetic media and an optical media.

The various exemplary apparatus, methodic and computer program product embodiments described above are provided in related numeric embodiments for convenience only. No limitation to the various exemplary embodiments disclosed is intended.

BRIEF DESCRIPTION OF DRAWINGS

The features and advantages of the various embodiments will become apparent from the following detailed description when considered in conjunction with the accompanying drawings. Where possible, the same reference numerals and characters are used to denote like features, elements, components or portions of the various inventive embodiments. It is intended that changes and modifications can be made to the described embodiment without departing from the true scope and spirit of the subject inventive embodiments as defined in the claims.

DETAILED DESCRIPTION

The various exemplary embodiments described herein provide an apparatus, method and computer program product which automatically selects and plays a media item on a portable media player and/or automatically orders the media items within a playlist upon a portable media player and/or automatically populates the media files within a play list upon a portable media player in response to a user imparting a physical shaking motion upon the casing of the portable media player.

The physical shaking of an object is a common human metaphor to mix the contents of the physical object; for example, shaking a bottle of salad dressing or a carton of orange juice. The various embodiments described herein, leverages this common and well known human activity by enabling a user to "mix" media items contained in the portable media player using the characteristic shaking motion. It is because shaking physical objects is so well known in the physical world that a unique user interface may be provided which allows for the natural and intuitive mixing of the media items.

Where necessary, computer programs, algorithms and routines are envisioned to be programmed in a high level language object oriented language, for example Java™ C++, C#, CORBA or Visual Basic™.

Figure 1:
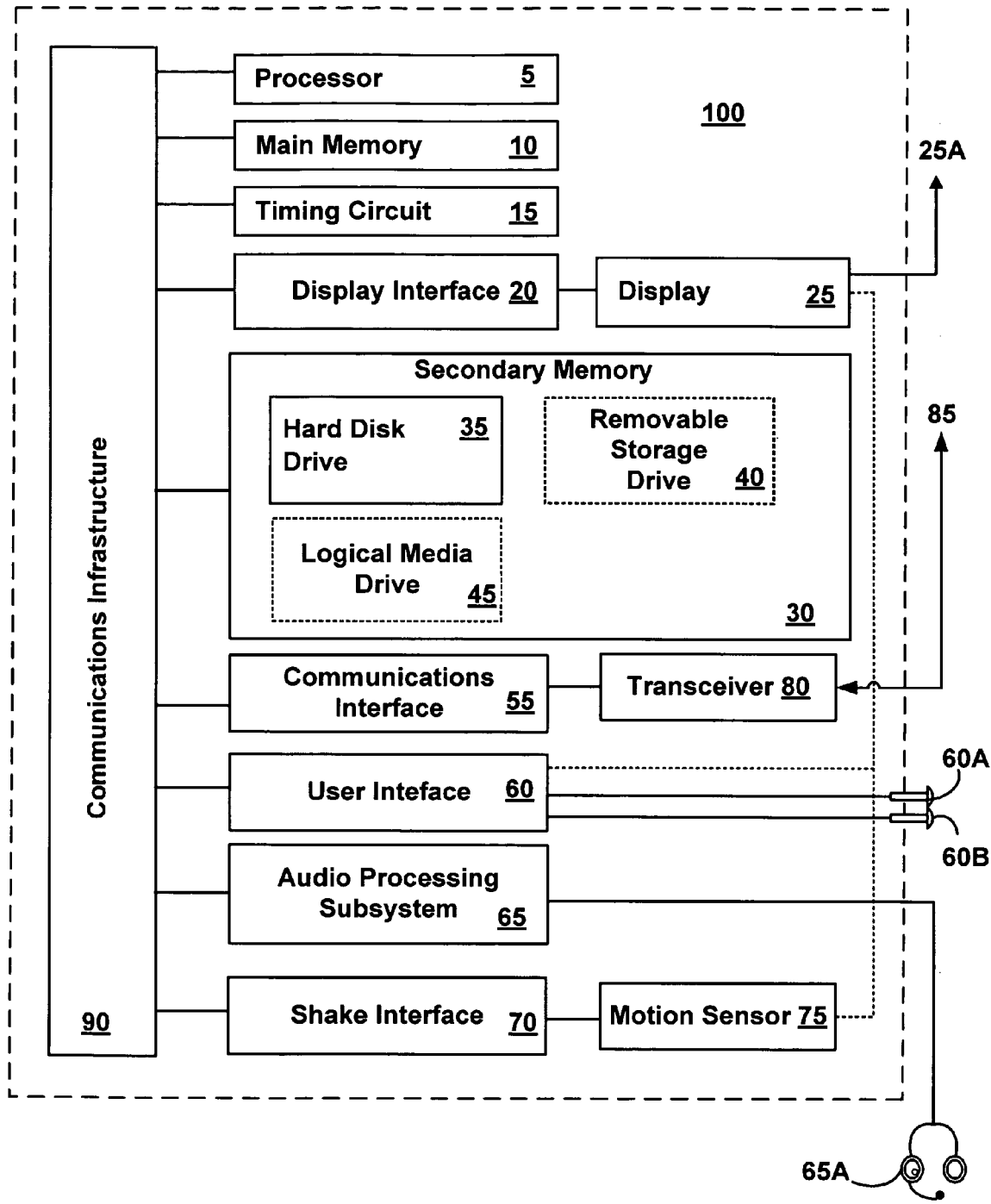
FIG. 1—depicts a generalized and exemplary block diagram of a portable media player.

Referring to FIG. 1, a generalized block diagram of a portable media player 100 is depicted. The portable media player 100 includes a communications infrastructure 90 used to transfer data, memory addresses where data items are to be found and control signals among the various components and subsystems associated with the portable media player 100. A processor 5 is provided to interpret and execute logical instructions stored in the main memory 10. The main memory 10 is the primary general purpose storage area for instructions and data to be processed by the processor 5. The main memory 10 is used in its broadest sense and includes RAM, EEPROM and ROM. A timing circuit 15 is provided to coordinate activities within the portable media player in near real time and to make time-based assessments of sensor data collected by sensors on board (or interfaced to) the portable media player. The processor 5, main memory 10 and timing circuit 15 are directly coupled to the communications infrastructure 90.

A display interface 20 is provided to drive a display 25 associated with the portable media player 100. The display interface 20 is electrically coupled to the communications infrastructure 90 and provides signals to the display 25 for visually outputting both graphics and alphanumeric characters. The display interface, may for example, display personal photographs access from memory 10 of the portable media player. The display 25 may also, for example, display textual playlists of musical media or other media items upon the portable media player 100. The display 25 may also, for example, display menus for interacting with software and/or firmware installed of the portable media player 100.

The display interface 20 may include a dedicated graphics processor and memory to support the displaying of graphics intensive media. The display 25 may be of any type (e.g., cathode ray tube, gas plasma) but in most circumstances will usually be a solid state device such as liquid crystal display.

A secondary memory subsystem 30 is provided which houses retrievable storage units such as a hard disk drive 35, a removable storage drive 40, an optional logical media storage drive 45 and an optional removal storage unit 50. One skilled in the art will appreciate that the hard drive 35 may be replaced with flash memory. The secondary memory 30 may be used to store a plurality of media items, including but not limited to a digital songs, images, photographs, jokes, multimedia presentations, a trivia questions, famous sayings, and/or cartoons images. The secondary memory 30 may also be referred to as a datastore 30.

The removable storage drive 40 may be a replaceable hard drive, optical media storage drive or a solid state flash RAM device. The logical media storage drive 45 may include a flash RAM device, an EEPROM encoded with playable media, or optical storage media (CD, DVD).

A communications interface 55 subsystem is provided which allows for standardized electrical connection of peripheral devices to the communications infrastructure 90 including, serial, parallel, USB, Firewire™ and network connectivity 85 using a transceiver 80.

The transceiver 80 facilitates the remote exchange of data and synchronizing signals between the portable media player 100 and other devices in processing communications 85 with the portable media player 100.

For networking, the transceiver 80 is envisioned to be of a radio frequency type normally associated with computer networks for example, wireless computer networks based on BlueTooth™ or the various IEEE standards 802.11x, where x denotes the various present and evolving wireless computing standards, for example WiMax 802.16 and WRANG 802.22.

Alternately, digital cellular communications formats compatible with for example GSM, 3G and evolving cellular communications standards. Both peer-to-peer (PPP) and client-server models are envisioned for implementation of the various embodiments. In a third alternative embodiment, the transceiver 80 may include hybrids of computer communications standards, cellular standards and evolving satellite radio standards.

The user interface 60 employed on the portable media play 100 may include a pointing device (not shown) such as a mouse, thumbwheel or track ball, an optional touch screen (not shown); one or more push-button switches 60A, 60B; one or more sliding or circular potentiometer controls (not shown) and one or more switches (not shown.) The user interface 60 provides interrupt signals to the processor 5 that may be used to interpret user interactions with the portable media player 100 and may be used in conjunction with the display 25.

For purposes of this specification, the term user interface 60 includes the hardware, firmware and operating software by which a user interacts with the portable media player 100 and the means by which the portable media player 100 conveys information to the user and may include a touch sensitive screen associated with the display 25.

In an embodiment, the user interface 60 may also be coupled to a specialized shake interface 70 which acts in concert with the user interface 60. In an alternate embodiment, the shake interface 70 operates independently of the more traditional user interface 60.

The motion sensor interface 70 may monitor interactions with in conjunction with the user interface 60. For example, the sensor interface 70 may be used to monitor a user's interaction with the one or more push-button switches 60A, 60B. An interrupt circuit may be incorporated into the hardware supporting the communications infrastructure 90.

The shake interface 70 is configured to receive signals from an operatively coupled motion sensor 75 and is operatively coupled to the communications infrastructure 90. The shake interface 70 may be configured to support one or more motion sensors 75 for detecting various kinds of deliberately imparted characteristic shaking motions on the portable media player 100. The motion sensor 75 may be disposed on a common circuit board which maintains the processor 5 or may be integrated into a case which encompasses the electronics associated with the portable media player 100. The shake interface 70 may include analog to digital conversion circuitry, signal conditioning circuitry, and/or anti-coincidence circuitry.

The motion sensor 75 is configured to detect when a user deliberately imparts a characteristic shake motion upon the portable media player 100 by shaking the device back and forth in his or her hand. Various characteristic shaking motions may be performed which allows for differentiation of the type of interaction with the portable media player 100 the user is seeking. For example, a defined series of shakes may be used to shuffle a current playlist. Alternately, a more rapid shaking motion (i.e., higher shaking frequency) may be used to cause a completely new playlist to be automatically generated by the portable media player 100. Other characteristic shaking motions are envisioned which may be defined by several parameters including frequency, magnitude, duration and number of motion events (shakes.) The characteristic shaking motions are performed in a manner roughly equivalent to how a user would shake a bottle of salad dressing to mix the bottle's contents.

A variety of motion sensor 75 elements may be employed to detect characteristic shaking motions imparted by the hand of a user upon the casing of a portable media player. However, for cost, size and power consumption considerations, a miniature accelerometer is preferred. For example, Analog Devices, Inc. manufactures many integrated Micro Electro Mechanical System™ accelerometers suitable for the various embodiments described herein. Information regarding the iMEMS™ accelerometers may be downloaded from the URL www.analog.com.

One or more accelerometer 75 may be oriented to detect accelerations in one or more degrees of freedom. A multi-axis accelerometer 75 may be used. In a simple embodiment, a single axis accelerometer 75 is employed; the axis of detection of the accelerometer being preferably oriented along the lengthwise axis of the portable media player 100. In this way, the accelerometer 75 is configured to detect motions imparted upon the portable media player by a user shaking it back and forth along its lengthwise axis.

An audio subsystem 85 is provided and electrically coupled to the communications infrastructure 90. The audio subsystem provides for the playback and recording of digital media, for example, multi or multimedia encoded in any of the exemplary formats MP3, AVI, WAV, MPG, QT, WMA, AIFF, AU, RAM, RA, MOV, MIDI, etc. The audio subsystem includes a microphone input port 95A for input of voice commands and a headphone, headset, ear buds or speaker output 95B. One skilled in the art will appreciate that the above cited list of file formats is not intended to be all inclusive.

Connection of the microphone 95A and/or headphones 95B includes both traditional cable and wireless arrangements such as BlueTooth™ are known in the relevant art. In addition, the audio subsystem 85 is envisioned to optionally include features such as graphic equalization, volume, balance, fading, base and treble controls, surround sound emulation, and noise reduction.

The portable media player 100 includes an operating system, the necessary hardware, software, and/or firmware drivers necessary to fully utilize the devices coupled to the communications infrastructure 90, media playback and recording applications and at least one control program 400 (FIG. 4) operatively loaded into the main memory 10. The control program 400 may perform multiple functions, for example perform the automatic selection of media items from a plurality of media items stored in datastore 30. The control program 400 may also, for example, perform the automatic population of play lists and/or the automatic re-ordering of play lists. The control program 400 also processes playlists, playing songs and/or displaying images in accordance with the sequential requirements of one or more playlists stored in memory. In some embodiments the playlists may be downloaded from external sources over the network 85. The control program 400 may be configured to control such downloading processes. The control program 400 also manages the downloading of new media items into the datastore 30 of the portable media player 100.

The control program 400 may also be configured to perform the various embodiments described herein. For example, the control program 400 is operative to monitor the shake interface 70 by reading the associated motion sensor 75 and storing data from the motion sensor 75 in memory 10 over time. The control program 400 may also read data from the timing circuit 15. The control program 400 processes the time varying signals provided by the motion sensor 75 (which is often an accelerometer) and determines based upon the time varying characteristics of the sensor signals whether or not the user has imparted characteristic shaking motions upon the portable media player 100.

One skilled in the art will appreciate that references to the control program 240 may be made in both singular and plural form. No limitation is intended by such grammatical usage as one skilled in the art will appreciate that multiple programs, objects, subprograms routines, algorithms, applets, contexts, etc. may be implemented programmatically to implement the various embodiments of the.

The control program 400 may also perform predictive functions, automatically selecting media items for the user that are statistically likely for the user to be in the mood for at a given time. A detailed discussions of the at least one control program 240 that performs predictive functions are provided in U.S. patent application Ser. No. 11/267,079 filed on Nov. 3, 2005 to the instant inventor and a common assignee is herein incorporated by reference in its entirety. Optionally, the portable media player 100 is envisioned to include at least one remote authentication application, one or more cryptography applications capable of performing symmetric and asymmetric cryptographic functions, and secure messaging software (not shown.)

Figure 2:
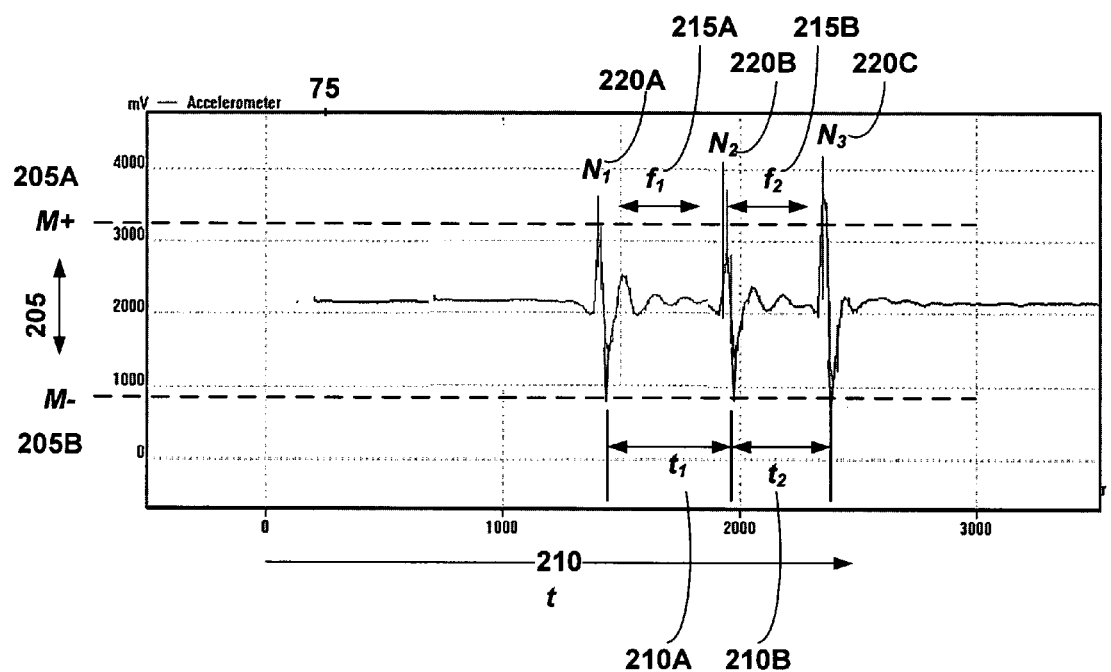
FIG. 2—depicts an exemplary signal trace of a motion sensor.

FIG. 2 provides an exemplary signal trace of an accelerometer arranged as a motion sensor 75 suitable for use in the various envisioned embodiments. This particular type of motion sensor 75 provides an analog voltage output signal which varies as a function of the acceleration(s) that the motion sensor is experiencing. For this particular device, a steady state voltage signal of 2000 millivolts (mV) is output from the motion sensor 75 when no accelerations are being detected. When undergoing either a positive or negative acceleration is presented, the voltage output from the accelerometer increases or decreases as functions of the magnitude of accelerations M+,M− 205A,B being experienced. When sampled over a time domain t 210, various motion dependent parameters may be determined which are useful as an alternative user interface.

In general, a characteristic shaking motion 205 may be identified from the time-varying motion sensor data based at least in part upon the presence of a roughly cyclic signal profile that falls within certain bounds and/or exceeds certain limits. Such bounds and/or limits may include frequency parameters, magnitude parameters, count parameters, and/or timing parameters. As shown by the time-varying motion sensor signal of FIG. 2, a characteristic shaking motion 205 manually imparted by a user generally includes a set of repeated acceleration impulses N1, N2, N3 220 A,B,C, each corresponding with a single manual shake event imparted by the user. Because a characteristic shaking motion 205 imparted manually by a user will generally include a plurality of shake events, each being imparted within a certain magnitude range and collectively being imparted within certain timing and/or frequency characteristics, a characteristic shaking motion 205 may be identified based upon the count, magnitude, timing, and/or frequency of the acceleration impulses present in the motion sensor data.

More specifically, a characteristic shaking motion 205 may be identified based upon the presence of impulse events that exceed a certain magnitude limits, meet certain frequency bounds, meet certain temporal spacing requirements, and/or contain a count of impulses that falls within certain numerical bounds. Thus, an analysis of the time-varying acceleration profile of motion data may be performed to determine if a characteristic shaking motion 205 has in fact been imparted by the user upon the portable media player 100 based upon magnitude, frequency, timing, and/or count characteristics. In general, this analysis includes an identification of impulse events and a determination as to whether the magnitude of impulse events, frequency of impulse events, temporal spacing of impulse events, and/or numerical count of impulse events meet certain bounds and/or exceed certain limits.

Referring back to FIG. 2, a characteristic shaking frequency f 215 may be determined from the frequencies f1, f2 215A,B measured between subsequent acceleration impulses N1, N2, N3 220A,B,C and may be used to identify a characteristic shaking motion 205 and/or to differentiate one characteristic shaking motion 205 from another. A cumulative number of peak acceleration impulses N1, N2, N3 220A,B,C may be counted to identify a characteristic shaking motion and/or to differentiate one characteristic shaking motion 205 from another. The time intervals t1, t2 210A,B between the peak acceleration impulses N1, N2, N3 220A,B,C may further be used to identify a characteristic shaking motion 205 and/or to differentiate one characteristic shaking motion 205 from another and/or determine the characteristic shaking frequency f 215. Lastly, the meeting or exceeding of defined magnitude thresholds M+, M− 205A,B by acceleration impulses N1, N2, N3 220A,B,C may likewise be used to identify a characteristic shaking motion 205 and/or to differentiate one characteristic shaking motion 205 from another.

In addition, one or more of these various motion dependent parameters may be used to control a function associated with the operation of the portable media player 100. More specifically, the detected magnitude of impulse events, the detected frequency of impulse events, the detected count of repeated impulse events, and/or the detected timing of impulse events may be used, at least in part, to control a function associated with the operation of the portable media player 100. Even more specifically, the detected magnitude of impulse events, the detected frequency of impulse events, the detected count of repeated impulse events, and/or the detected timing of impulse events may be used, at least in part, to control the extent of randomization, re-ordering and/or re-populating of a playlist or other play arrangement on the portable media player 100.

Additionally, the various motion dependent parameters may be determined in multiple geometric axes 325 (FIG. 3) which may useful for discriminating against unintentional accelerations detected by the motion sensor 75 from being processed by the processor 5. In addition, ambient accelerations imparted due to the constant force of gravity and/or due to a moving reference frame of the user may be filtered from or otherwise differentiated from the shaking motion signal data using traditional signal processing techniques.

With respect to the identification of a single impulse event N1, N2, or N3 220A,B,C, such an event can generally be identified as a rapidly changing acceleration signal that exceeds a certain upper threshold M+ 205A and exceeds a certain lower threshold M− 205B, and does both within a certain small time period Δt. The value used for M+, M−, and Δt may vary and are generally selected based upon the size and weight of the portable media player itself and the characteristics of the accelerometer employed. For the system that generated the signal profile shown in FIG. 2, Δt was defined as 100 milliseconds, although smaller values may be used for greater impulse event discrimination. An upper threshold M+ 205A is approximately 3000 mV; the lower threshold M− 205B is approximately 1000 mV.

As the acceleration signals of FIG. 2 are processed, there are no characteristic shaking motion events detected by the control program until the time profile reaches approximately 1400 milliseconds in time t 210. At this time, a positive voltage transient exceeds the upper threshold M+ 205A. This voltage transient corresponds with a user moving the portable media player 100 with sufficient force to exceed the upper threshold M+ 205A of acceleration; a negative voltage transient which exceeds the lower threshold M− 205B immediately following the positive voltage transient. This corresponds with the user moving the portable media player 100 with sufficient force to exceed the lower threshold M− 205B. Both thresholds are crossed within a time span of approximately 100 milliseconds (i.e. within the limits of the defined Δt). This means that the user imparted a sufficient acceleration upon the portable media player in a first direction to exceed positive threshold M+ 205A and then immediately reversed direction and within the required Δt time period, imparted a sufficient acceleration upon the portable media player in the reverse direction to exceed negative threshold M− 205B.

As such, the control program 400, may determine that the voltage transients exceeded both the positive M+ 205A and negative thresholds M− 205B within certain predefined time duration (e.g. 100 milliseconds), to elucidate that a characteristic shake motion 205 impulse event has occurred. The control program 400 may further process the data, identifying subsequent impulse events N2, N3, . . . Nn, in a similar manner. The control program 400 may then determine from the count of sequential impulse events, the frequency of sequential impulse events, and/or the timing of sequential impulse events, if particular characteristic shaking motions have occurred. In addition, count, frequency, and/or timing characteristics may be quantified for use in controlling the extent of certain media player actions.

It should be noted that while positive threshold M+ 205A and negative threshold M− 205B are shown in FIG. 2 to be equally distant from the nominal no-acceleration signal profile, this need not be the case in all embodiments. In some embodiments a larger threshold may be employed in one direction as compared to the opposite direction. In fact, this is often desired because a human user generally imparts greater acceleration upon an object he is shaking when extending arm muscles as compared to when flexing arm muscles during a reciprocating characteristic shaking motion.

In some embodiments, a sequence of shake events may be specifically required by the control program 400 in order for a user to indicate a particular user interface intention to the portable media player 100. For example, the control program 400 may be configured to determine that a deliberate shaking motion has been imparted by the user only if a particular sequence of characteristic shake impulses N1, N2, N3 220A, B,C events are detected in the sensor signals. For example, in some embodiments, the N1, N2, N3 220A,B,C is configured to determine that the user is deliberately shaking the portable media player if three or more characteristic single-shake acceleration impulses are detected in sequence within the acceleration data, each single-shake acceleration profile being separated by a certain minimum amount of time (for example 250 milliseconds) t1, t2 210A,B, and all three of the single-shake acceleration profiles being imparted upon the portable media player 100 within a certain maximum amount of time (e.g., 2000 milliseconds), each of the three characteristic single-shake acceleration impulses N1, N2, N3 220A, B,C indicating a deliberate user shake as a result of exceeding the positive M+205A and negative acceleration threshold M−205B.

Figure 3:
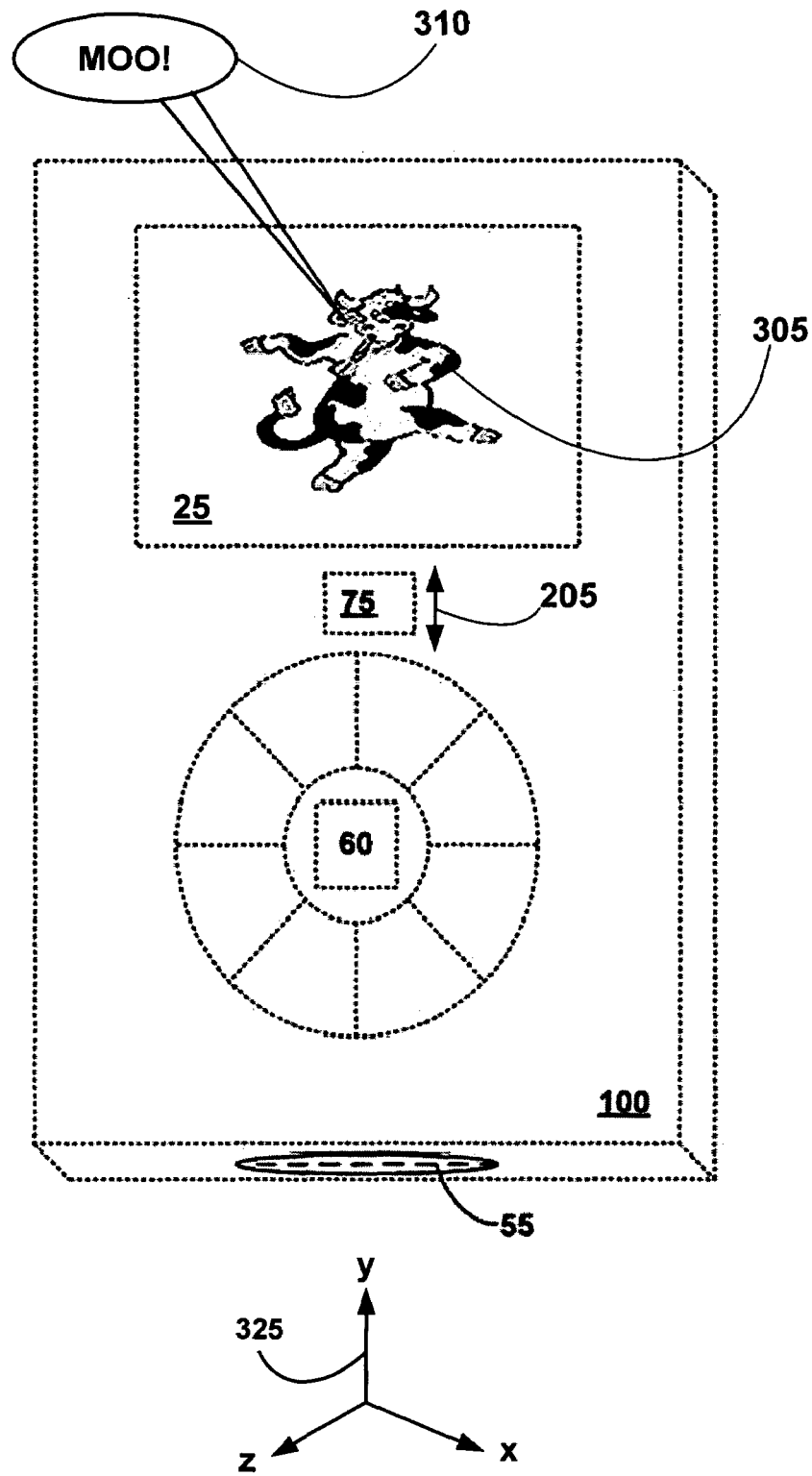
FIG. 3—depicts a generalized and exemplary diagram of an embodiment of the portable media player.

Referring to FIG. 3, the various embodiments, leverages an intuitive shaking metaphor and establishes a unique user interface for a portable media player 100 in which a user can select, re-order, scramble, randomize, and/or otherwise alter the selection and/or ordering of media items stored within a play arrangement and/or played by the portable media player 100 by physically shaking the portable media player 100 in a characteristic and repeatable manner.

In an exemplary embodiment of a portable media player 100 equipped with an accelerometer type motion sensor 75 is depicted. Deliberate accelerations 205 imparted on the portable media player cause a control program 400 (FIG. 4) to change an existing play arrangement related to either a planned playlist or a currently play media item. In an embodiment, execution of the control program 400 is accompanied by a whimsical image 305 outputted to the display 25 and/or an audible sound 310 which provides feedback to the user that a change to the existing play arrangement has been initiated. In some embodiments the image displayed may represent a mixing action, emulating the look of objects being shaken and mixed upon the screen. This exemplary embodiment of the portable media player 100 includes a display 25, a finger manipulatable user interface 60 and an external connectivity port which is coupled to the communications interface 55. As previously discussed, the motion sensor 75 may provided with multi-axis 325 detection capabilities as may be envisioned for the various embodiments.

In some embodiments, a "shuffling music sound" may be provided to the user during and optionally soon following the characteristic shaking motion to indicate that the media items are being randomized. This shuffling music sound may be, for example, a sequence of very short clips of songs played in rapid succession to indicate figuratively that songs are being shuffled in memory. The media clips may be, for example, 100 to 500 ms long and played in sequence during the characteristic shaking motion 205 and for a duration following the shaking motion that lasts for example, 1500 ms.

Upon completion of the change in the play arrangement, a particular media item may be automatically selected from the datastore 30 and automatically played to the user in its entirety (unless interrupted by another characteristic shaking motion 205 of the user). In this way, a user may cause his or her media player to automatically select and play a media item in response to his or her characteristic shaking motion of the portable media player 100 itself. This is often more convenient, more intuitive, and more fun than a traditional method of engaging a finger manipulated button or control. It can also be performed without looking at the portable media player 100 to find a particular interface control element, and thus can be done with less sensory distraction or concentration than traditional methods.

In an alternate embodiment, the portable media player 100 is configured to automatically shuffle, re-order, re-populate, or otherwise re-arrange a planned playlist or other planned play arrangement of a plurality of media files stored within the portable media player 100 in response to a characteristic shaking motion 205. Such alteration of the planned play arrangement maybe performed in conjunction with the visual display of mixing imagery and/or audio play of a shuffling sound to accentuate the shaking and mixing metaphor for the user.

In an alternate embodiment, the portable media player 100 is configured to automatically select an image media file (for example a personal photograph from a stored album of photographs) from a plurality of available media items from the datastore 30 of the portable media player 100 and automatically display the image upon the display 25 of the portable media player 100 in response to a characteristic shaking motion. Thus to a user the act of shaking the portable media player feels as if he or she is shuffling the images within the portable media player 100 and having a randomly selected image be selected and displayed. Again this is a fun, intuitive, and convenient method of user interaction as compared to traditional methods In an analogous embodiment, a "shuffling image display" may be provided in which a series of quickly flashed images are outputted to the display 25; each of the quickly flashed images being selected from the datastore 30 as if being shuffled in real time. The quickly flashed images may be displayed, for example, for 100 to 500 ms each and displayed in rapid sequence during the characteristic shaking motion and for a short duration following the shaking motion that lasts, for example 2000 ms. The flashing imagines may gradually decelerate after the shaking motion has ceased. Upon completion of the change in the play arrangement, a single image may be selected and outputted to the display 25. This provides the user with an intuitive visual indication that the media mixing process is underway.

Figure 4:
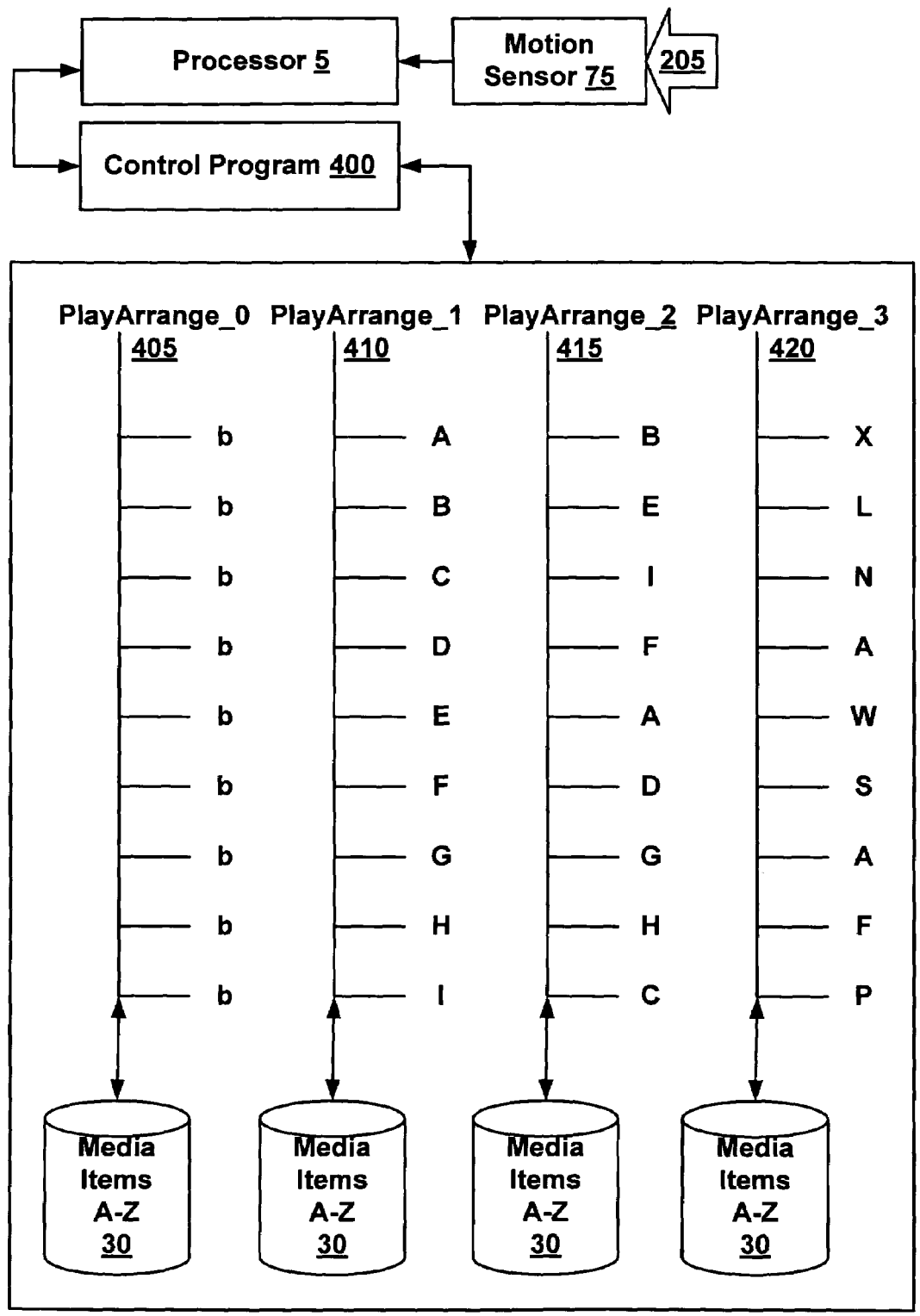
FIG. 4—depicts an exemplary functional diagram of a control program.

FIG. 4 provides an exemplary operational block diagram illustrating the functionality of the control program 400. In an embodiment, a motion sensor 75 detects motion signals in response to user imparted motion 205 on the portable media player 100. The motion signals are processed by the processor 5 using the control program 400 to determine if the detected motions signals are characteristic of a deliberate manual shaking motion user interaction with the portable media player 100. In an embodiment, an initial play arrangement 405 may have no predetermined media items selected for a play arrangement, for example a playlist.

In an embodiment, a default play arrangement 405 containing blank entries b or and or lacking cross references to the media items A-Z maintained in the datastore 30. A characteristic shaking motion may be used to populate the play arrangement 410 for example in an alphabetical order by either retrieving the actual media items A-I maintained in the datastore 30 or creating a cross referenced playlist which allows the retrieval of a particular media item in a queue as the playlist advances through a play arrangement.

If the user desires to shuffle the originally assigned media items of the existing play arrangement 410, the user may provide another characteristic shaking motion which shuffles the original selection A-I in a modified order to form another play arrangement 415. Alternately, the user may desire alternate media items to be selected from the entire pool of available media items A-Z maintained by the datastore 30. In this embodiment, the user may provide another characteristic shaking motion 205 which provides automatic selection of alternate media items to replace some or all of the media items in the current play arrangement, thus producing a different play arrangement 420. In this way, embodiments may be configured to enable a user to cause the portable media player to re-order and/or re-populate a planned play arrangement in response to a characteristic shaking motion 205 imparted by the user. Such re-ordering and/or re-population may be performed using a random and/or semi-random selection process.

The various play arrangements 405, 410, 415, 420 enables a user to have a portable media player 100 automatically select media items from a datastore 30,B,C,D and populate a play arrangement using the automatically selected media items in response to the characteristic shaking motion 205 of the portable media player 100 by the user.

In various embodiments, the number of randomly selected media items; the extent of the randomization accomplished; and/or a randomization seed value used in changing the play arrangement may be dependent upon the magnitude and/or duration of the characteristic shaking motions 205 imparted by the user. In this way, a user may shake the portable media player 100 for a longer period of time in order to cause a more extensive change to a planned play arrangement, thereby providing a fun and intuitive interaction for the user.

The above described embodiments are advantageous where a user does not wish to shake the portable media player 100 every time he or she desires a new randomly selected song (or other media item) to be played. Instead, the user may desire that portable media player 100 automatically creates a play arrangement 410 of a plurality of future media items to be played each time the user performs the characteristic shaking motion 205. To accommodate such a user desire, the control program 400 may be configured to generate and/or modify a listing of planned media items each time the user characteristically shakes the portable media player 100.

The resulting play arrangement 410, 415, 420 indicates the media items and play sequence that will be followed for a period of time in the future. The portable media player 100 will begin playing the first media item in the play arrangement 410 and when it is complete, will continue to the next media item in the play arrangement 410.

Play of the selected media items will continue until all the media items in the play arrangement 410 are played; or until the user provides another characteristic shaking motion of the portable media player 100, causing the control program 400 to cease playing the current play arrangement 410 and to generate a new play arrangement 415 and/or modify the existing play arrangement 420. In many embodiments, control program 400 outputs the current play arrangement to the display 25 of the portable media player 100 so the user can optionally view this planned sequence of media items.

In various embodiments, the user may combine a characteristic shaking motion with a button press 60A,B as a means of specifying a specific desired user intent and corresponding portable media player action. For example, a user may characteristically shake the portable media player 100 while simultaneously depressing a particular button 60A to specify a particular command. The system upon detecting the characteristic shaking motion 205 in combination with the specific detected button press 60A may respond accordingly by taking a particular action. The particular action may include selecting a play arrangement 410 from the datastore 30, re-ordering a play arrangement of media items 415; and/or repopulating a play arrangement of media items 420.

Figure 4A:
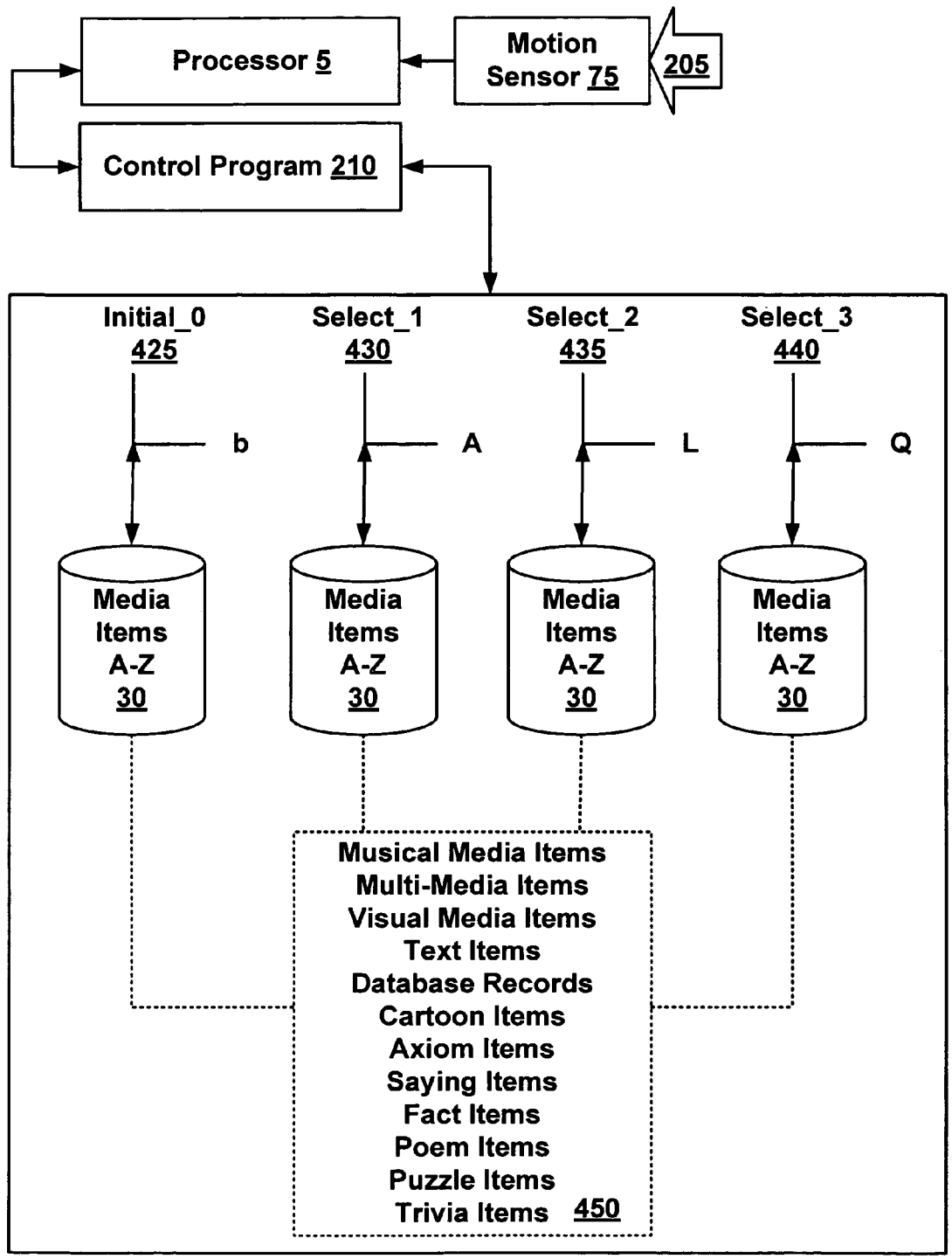
FIG. 4A—depicts another exemplary functional diagram of the control program.

Referring to FIG. 4A, an operational block diagram illustrating an alternate embodiment of the functionality of the control program 400 is depicted. In this embodiment, a motion sensor 75 detects motion signals in response to user imparted manual shaking motions 205 on the portable media player 100. The motion signals are processed by the processor 5 using the control program 400 as before to determine if the detected motions signals are characteristic of a deliberate manual shaking motion user interaction with the portable media player 100. In this embodiment, an initial media item selection 425 may be required by providing the characteristic shaking motion 205 to establish an initially selected media item 430 retrieved from the datastore 30. If the user desires to change the initially selected media item 430, the user may perform another characteristic shaking motion 205 upon the portable media player 100; causing the control program 400 to cease playing the current media item 430 and randomly selecting a different media item 435 from the datastore 30; and will begin playing the newly selected media item 435. Thus the user by simply shaking the portable media player may cause the control program 400 to automatically replace the currently playing media 435 item with a new automatically selected media item 440 from the datastore 30. In a common embodiment, the newly selected media item is not played until after the user has ceased the characteristic shaking motion 205 and not during the shaking motion itself. This provides a fun and intuitive user interface metaphor where the shaking motion is perceived as causing a physical mixing of the media items, the new media item not being played until the physical mixing process has been completed. In some such embodiments an image or sound indicative of mixing is output during the shaking motion and upon completion of the shaking motion, the new media item begins play.

Because a user can interrupt the play of a media item and cause the selection of a new media item by physically shaking the portable media player 100, the various embodiments provides a fun and intuitive method by which a user can quickly sample a variety of automatically selected media items by simply shaking and listening, shaking and listening, until a desirable media items plays.

The media items 450 may include digital representations of musical media, multi-media, visual media, text items, database records, cartoons, axiom, saying, facts, poems, puzzles, trivia, horoscopes, famous quotes, etc.

Figure 5:
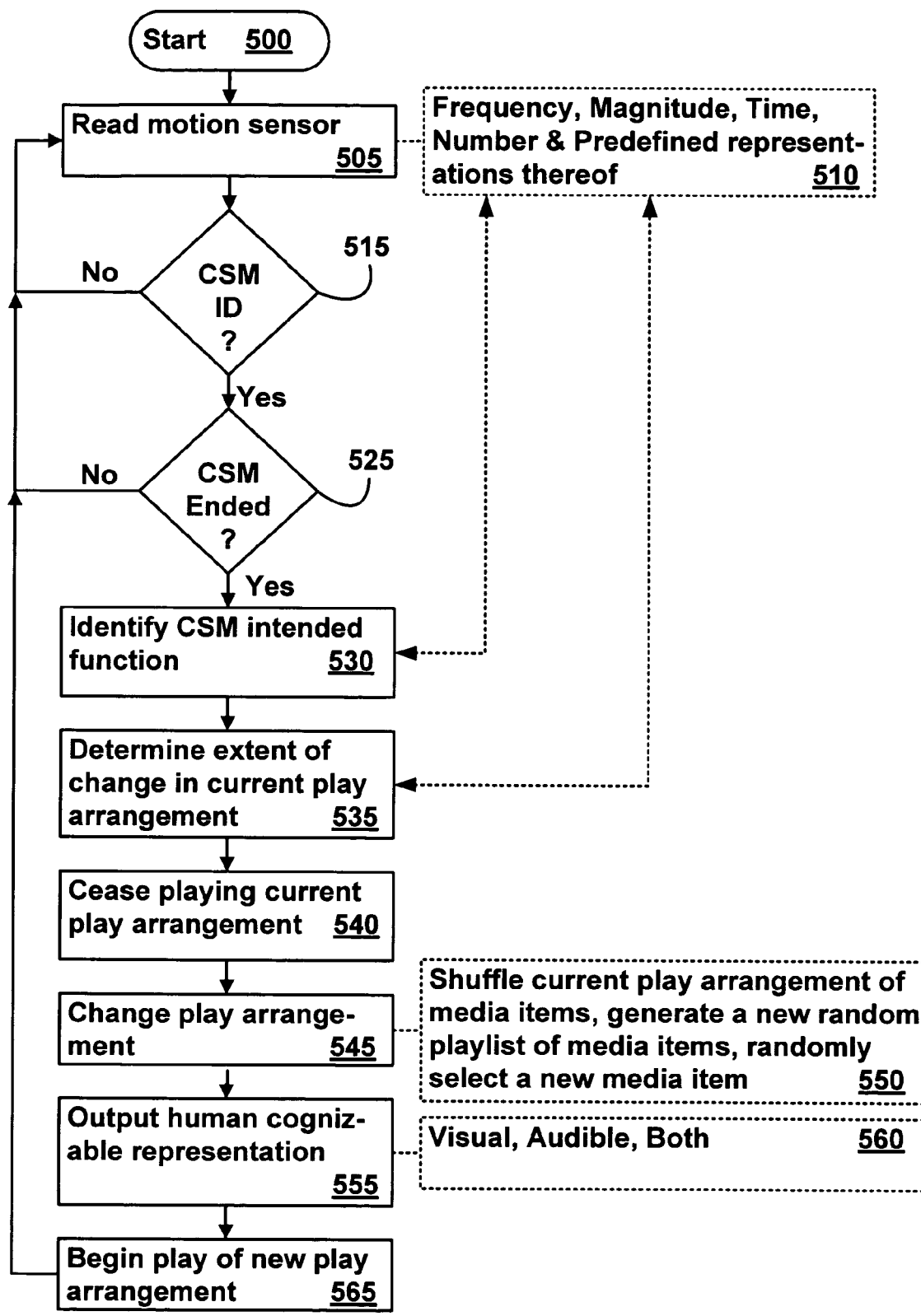
FIG. 5—depicts an exemplary process flow chart of the various embodiments.

FIG. 5 depicts an exemplary process flow chart for implementing one or more of the various embodiments. The process is initiated 500 by periodically reading a motion sensor 505 coupled to a processor associated with a portable media player. A control program reads the signals provided by the motion sensor, and based on one or more of a frequency, magnitude, time duration, impulse count, and/or other predefined representations thereof 510 determines if characteristic shake motions (CSM) have been identified 515. If CSM have not been identified 515, the control program continues to monitor the motion sensor to identify CSM 505. If CSM have been identified 515, the control program then determines if the identified CSM have ended 525.

If the identified CSM have not ended 525, the control program continues to monitor the motion sensor for CSM signals 505 until the identified CSM have ended 525. In certain embodiments, the control program may perform certain actions during the CSM, for example playing a representative mixing sound and/or displaying a representative mixing image. In certain embodiments a currently playing media item may be ceased during the shaking motion and/or during the playing of a representative mixing sound and/or displaying a representative mixing image. Thus, in certain embodiments, the control program causes a human cognizable representation to be outputted from the portable media player during the shaking motion, the human cognizable representation including one or more visual images, audible sounds and a combination thereof that are figuratively representative of the media mixing process.

In an optional process element, the control program further identifies the intended function linked to the identified CSM 530 in dependence on one or more of the on one or more of a frequency, magnitude, time duration, count, and/or predefined representations thereof 510.

In another optional process element, the control program determines in dependence on the one or more of the frequency, magnitude, time duration, count, and/or predefined representations thereof 510, the extent of change in the current play arrangement 535.

The control program then causes the current play of a media item associated with the current play arrangement to cease playing 540 and changes the play arrangement 545 by one or more of shuffling media items in the current play arrangement, automatically generating a new play arrangement of media items, and/or automatically selecting a new media item for play 550. The automatic generation and/or automatic selection may be performed using a random or semi-random selection process.

In another optional embodiment, the control program causes a human cognizable representation to be outputted from the portable media player 555. The human cognizable representation may include one or more visual images, audible sounds and a combination thereof 560. Such images and/or sounds are preferably selected to be figuratively representative of the media mixing process.

Once generation of the new play arrangement has been completed, the new play arrangement begins play 565 and the control program continues to read the motion sensor for CSM signals 505.

The foregoing described exemplary embodiments are provided as illustrations and descriptions. They are not intended to limit the inventive scope to any precise form described. In particular, it is contemplated that functional implementation of the control program described herein may be implemented equivalently in hardware, software, firmware, and/or other available functional components or building blocks. Other variations and embodiments are possible in light of above teachings, and it is not intended that this Detailed Description limit the scope of inventive embodiments, but rather by the Claims following herein.

What is claimed:

1. A shake responsive portable media player comprising:
    a processor;
    a memory functionally coupled to the processor;
    a motion sensor functionally coupled to the processor and configured to detect shaking motions imparted on the portable media player by a user; and
    a control program operatively loaded into the memory including instructions executable by the processor to identify deliberately imparted characteristic shaking motions from the detected shaking motions and to change a play arrangement in dependence on the identified characteristic shaking motions,
    wherein the play arrangement comprises an element selected from a group consisting essentially of a predefined playlist of media items, a randomly generated playlist of media items, and at least one randomly selected media item, and
    wherein the change in the play arrangement comprises at least one action selected from a group consisting essentially of shuffling an order of media items in the predefined playlist, generating another randomized playlist of media items, and randomly selecting another media item for play.

2. The shake responsive portable media player according to claim 1 wherein the motion sensor is an accelerometer.

3. The shake responsive portable media player according to claim 1, wherein the characteristic shaking motions are identified by the control program based on at least one parameter selected from a group consisting essentially of a frequency, a magnitude, a time duration, and a count of detected events.

4. The shake responsive portable media player according to claim 1, wherein the control program further includes instructions executable by the processor to determine if the detected characteristic shaking motion exceeds at least one parameter selected from a group consisting essentially of a predefined magnitude threshold and a predefined time duration threshold.

5. The shake responsive portable media player according to claim 1 wherein an extent of the change in the play arrangement is dependent at least in part upon a duration of the characteristic shaking motions.

6. The shake responsive portable media player according to claim 1 wherein an extent of the change in the play arrangement is dependent upon a magnitude of the characteristic shaking motions.

7. The shake responsive portable media player according to claim 1, wherein the media items are musical media files.

8. The shake responsive portable media player according to claim l, wherein the characteristic shaking motions are identified based at least in part upon an amplitude of the detected shaking motions that falls within a predefined bounds for more than a minimum time duration.

9. The shake responsive portable media player according to claim 1, wherein the random selection of the media item is completed after a cessation of the identified characteristic shaking motions.

10. The shake responsive portable media player according to claim 1, wherein play of the randomly selected media item occurs after cessation of the identified characteristic shaking motions.

11. The shake responsive portable media player according to claim 1 wherein the control program further includes instructions executable by the processor to output a human cognizable representation concurrent with the change in the play arrangement.

12. The shake responsive media player according to claim 11, wherein the human cognizable representation comprises at least one element selected from a group consisting essentially of a characteristic sound and a characteristic visual display.

13. The shake responsive media player according to claim 1, wherein the media item comprises a representation selected from a group consisting of a song, a cartoon, an axiom, a saying, a fact, a joke, a puzzle, and a trivia question.

14. A method for providing a shake responsive portable media player comprising:

functionally coupling a motion sensor to a processor associated with the portable media player; configuring the motion sensor to detect shaking motions imparted on the portable media player by a user; and operatively loading into a memory coupled to the processor a control program including instructions executable by the processor for identifying deliberately imparted characteristic shaking motions from the detected shaking motions and for changing a play arrangement in dependence on the identified characteristic shaking motions, wherein changing a play arrangement comprises at least one step selected from a group consisting essentially of shuffling an order of media items in a predefined playlist, generating a new randomized playlist of media items, and randomly selecting a new media item for play, and wherein the control program further includes instructions executable by the processor for playing the randomly selected media item after cessation of identified characteristic shaking motions.

15. The method according to claim 14 wherein the control program further includes instructions executable by the processor for determining if the detected shaking motions exceed at least one parameter selected from a group consisting essentially of a predefined magnitude threshold, a predefined time duration threshold, and a predetermined event count threshold.

16. The method according to claim 14 wherein the control program further includes instructions executable by the processor for varying an extent of the change in the play arrangement in at least partial dependence on a duration of the identified characteristic shaking motions.

17. The method according to claim 16, wherein the control program further includes instructions executable by the processor for varying the extent of the change in the play arrangement in further dependence on a magnitude of the identified characteristic shaking motions.

18. The method according to claim 14, wherein randomly selecting the media item is performed after a cessation of the identified characteristic shaking motions.

19. The method according to claim 14, wherein the control program further includes instructions executable by the processor for outputting a human cognizable representation concurrently with changing the play arrangement.

20. The method according to claim 19 wherein the human cognizable representation comprises at least one element selected from a group consisting essentially of a characteristic sound and a characteristic visual.

21. A computer program product embodied in a tangible form comprising instructions executable by a processor associated with the portable media player to change a play arrangement of media items in dependence on identified characteristic shaking motions determined from shaking motions detected by a motion sensor coupled to the processor, wherein the play arrangement comprises an element selected from a group consisting essentially of a predefined playlist of media items, a randomly generated playlist of media items, and at least one randomly selected media item, and wherein the change in the play arrangement comprises at least one action selected from a group consisting essentially of shuffling an order of media items in a predefined playlist, generating a new randomized playlist of media items, and randomly selecting a new media item for play.

22. The computer program product according to claim 21, further including instructions executable by the processor for identifying the characteristic shaking motions based upon the detected shaking motions exceeding at least one parameter selected from a group consisting of a predefined magnitude threshold, a predefined time duration threshold, and a predetermined event count threshold.

23. The computer program product according to claim 21 further including instructions executable by the processor for varying an extent of the change in the play arrangement in at least partial dependence on a duration of a detected characteristic shaking motion.

24. The computer program product according to claim 23 further including instructions executable by the processor for varying the extent of the change in the play arrangement in further dependence on a magnitude of a detected characteristic shaking motion.

25. The computer program product according to claim 21, wherein the tangible form comprises an element selected from a group consisting of a logical media, a magnetic media, and an optical media.

* * * * *